(12) United States Patent
Kurasawa et al.

(10) Patent No.: US 11,347,362 B2
(45) Date of Patent: May 31, 2022

(54) ELECTRONIC DEVICE

(71) Applicant: Japan Display Inc., Tokyo (JP)

(72) Inventors: Hayato Kurasawa, Tokyo (JP); Makoto Hayashi, Tokyo (JP); Naosuke Furutani, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/781,470

(22) Filed: Feb. 4, 2020

(65) Prior Publication Data

US 2020/0174603 A1 Jun. 4, 2020

Related U.S. Application Data

(63) Continuation of application No. 16/005,033, filed on Jun. 11, 2018, now Pat. No. 10,592,059, which is a
(Continued)

(30) Foreign Application Priority Data

Aug. 7, 2012 (JP) .................... 2012-175215
Jul. 26, 2013 (JP) .................... 2013-155265

(51) Int. Cl.
*G06F 3/00* (2006.01)
*G06F 3/044* (2006.01)
(Continued)

(52) U.S. Cl.
CPC ........ *G06F 3/0446* (2019.05); *G02F 1/13338* (2013.01); *G06F 3/047* (2013.01);
(Continued)

(58) Field of Classification Search
CPC ............... G02F 1/13338; G02F 1/1339; G06F 3/04166; G06F 3/0412; G06F 3/0445;
(Continued)

(56) References Cited

U.S. PATENT DOCUMENTS

2010/0182273 A1* 7/2010 Noguchi ........... G02F 1/134363
345/174
2011/0032444 A1* 2/2011 Yamazaki ............. H01L 27/127
349/42
(Continued)

FOREIGN PATENT DOCUMENTS

| CN | 102446495 | 5/2012 |
|---|---|---|
| JP | 2009-244958 | 10/2009 |
| JP | 2012-073783 | 4/2012 |

OTHER PUBLICATIONS

Office Action issued in related Chinese Patent Application No. 201710205677.2 dated Jul. 1, 2019 and machine translation of same. 20 pages.
(Continued)

*Primary Examiner* — Michael A Faragalla
(74) *Attorney, Agent, or Firm* — K&L Gates LLP

(57) ABSTRACT

According to an example aspect, an electronic device comprises a substrate, pixels on the substrate, a first electrode overlapping the pixels in a plan view, and a second electrode overlapping an edge of the first electrode in a plan view. The first electrode has a first region that overlaps the second electrode in a plan view and a second region that does not overlap the second electrode in a plan view.

11 Claims, 21 Drawing Sheets

Related U.S. Application Data continuation of application No. 15/131,227, filed on Apr. 18, 2016, now Pat. No. 10,025,422, which is a continuation of application No. 14/703,462, filed on May 4, 2015, now Pat. No. 9,335,882, which is a continuation of application No. 13/955,079, filed on Jul. 31, 2013, now Pat. No. 9,052,768.

(51) Int. Cl.
*G06F 3/041* (2006.01)
*G02F 1/1333* (2006.01)
*G06F 3/047* (2006.01)
*G09G 5/00* (2006.01)
*G02F 1/1339* (2006.01)

(52) U.S. Cl.
CPC .......... *G06F 3/0412* (2013.01); *G06F 3/0445* (2019.05); *G06F 3/04166* (2019.05); *G09G 5/006* (2013.01); *G02F 1/1339* (2013.01); *G09G 2300/0426* (2013.01)

(58) Field of Classification Search
CPC ................. G06F 3/0446; G06F 3/047; G09G 2300/0426; G09G 5/006
See application file for complete search history.

(56) References Cited

U.S. PATENT DOCUMENTS

2012/0075238 A1    3/2012    Minami et al.
2012/0081412 A1    4/2012    Kim et al.

OTHER PUBLICATIONS

Chinese Second Office Action dated Nov. 28, 2019 in corresponding Chinese Application No. 201710205677.2.

* cited by examiner

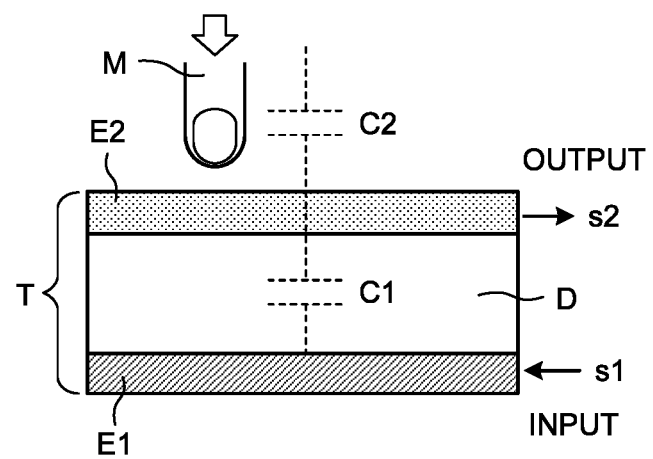
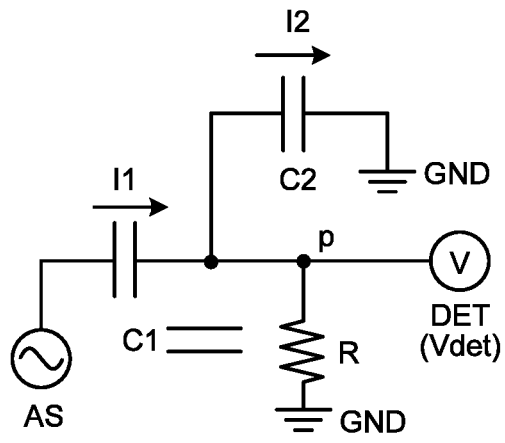

FIG.9
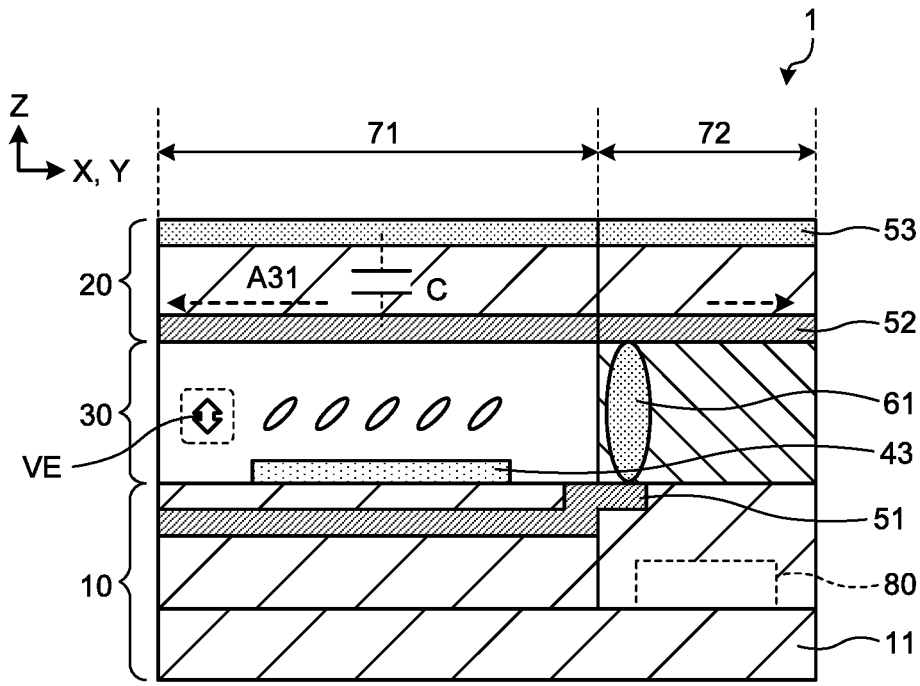
 : VERTICAL ELECTRIC FIELD MODE
FIG.10
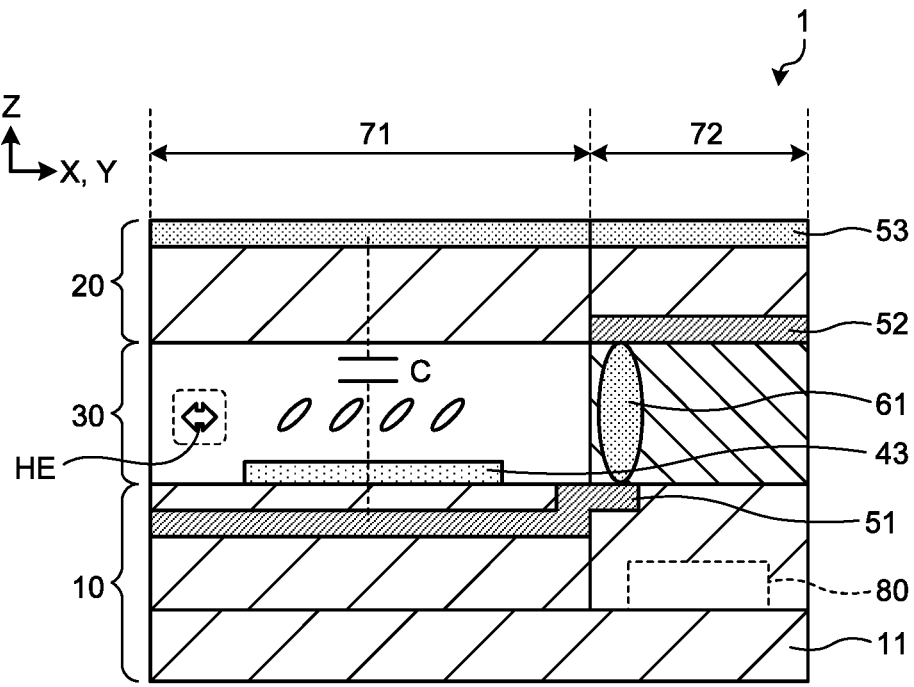
 : HORIZONTAL ELECTRIC FIELD MODE

- 512 FILTER GLASS
- 510 VIDEO DISPLAY SCREEN UNIT
- 511 FRONT PANEL

SHUTTER BUTTON 524
LIGHT-EMITTING UNIT 521
525 LENS COVER

543 DISPLAY UNIT
542 KEYBOARD
541 BODY

551 UPPER HOUSING
554 DISPLAY
552 LOWER HOUSING

ELECTRONIC DEVICE

CROSS REFERENCES TO RELATED APPLICATIONS

The present application is a continuation of U.S. patent application Ser. No. 16/005,033, filed Jun. 11, 2018, which is a continuation of U.S. patent application Ser. No. 15/131,227, filed Apr. 18, 2016, which is a continuation of U.S. patent application Ser. No. 14/703,462, filed May 4, 2015, which is a continuation of U.S. patent application Ser. No. 13/955,079, filed Jul. 31, 2013, which claims priority to Japanese Priority Patent Application JP 2012-175215 filed in the Japan Patent Office on Aug. 7, 2012, and JP 2013-155265 filed in the Japan Patent Office on Jul. 26, 2013, the entire content of each of which is hereby incorporated by reference herein.

BACKGROUND

1. Technical Field

The present disclosure relates to techniques, for example, for a display device such as a liquid crystal display device (LCD), for a touch sensor (also called a touch panel [TP]), for a liquid crystal display device with a touch sensor (in other words, a liquid crystal touch panel module), and for an electronic apparatus. The present disclosure particularly relates to a technique for a liquid crystal display device with an in-cell capacitive touch sensor.

2. Description of the Related Art

Examples of liquid crystal display devices with a touch sensor whose liquid crystal display function implements a touch sensor function, particularly for reducing thickness for example, include a liquid crystal display device with an in-cell touch sensor (called, for example, "in-cell touch LCD" or "in-cell liquid crystal touch panel").

A liquid crystal display device with an in-cell capacitive touch sensor as a related example has an array substrate (also called a TFT substrate) and a color filter (CF) substrate that are elements constituting the liquid crystal display function, and a liquid crystal layer interposed between the array substrate and the CF substrate. The array substrate is provided with thin-film transistors (TFTs) including gate electrodes and source electrodes, pixel electrodes, retention capacitors, a common electrode, and the like. The CF substrate is provided with a color filter and the like. The liquid crystal display device with a touch sensor includes a touch drive electrode (transmitting electrode referenced as Tx) and a touch detection electrode (receiving electrode referenced as Rx) that are elements constituting the touch sensor function.

The above-described liquid crystal display device with a touch sensor particularly has a particular example configuration (called "combined use type") in which an electrode unit and a wiring layer for the liquid crystal display function is partially used also as an electrode unit and a wiring layer for the touch sensor function. A configuration example is described, for example, in Japanese Patent Application Laid-open No. 2009-244958.

For example, in a configuration example (first related configuration example) of the combined use type liquid crystal display device with a touch sensor corresponding to a vertical electric field mode LCD, the array substrate includes a first electrode that is a first common electrode unit (referenced as COM1), and an electrode unit used as both a second common electrode unit (referenced as COM2) and the transmitting electrode Tx is configured as a second electrode on the inner side (on the side nearer to the liquid crystal layer) of the CF substrate, and the receiving electrode Rx is configured as a third electrode on the outer side (front surface) of the CF substrate.

In a configuration example (second related configuration example) of the combined use type liquid crystal display device with a touch sensor corresponding to a horizontal electric field mode LCD, an electrode unit used as both a common electrode (referenced as COM) and the transmitting electrode Tx is configured as a first electrode on the array substrate, and the receiving electrode Rx is configured as a second electrode on the CF substrate.

The horizontal electric field mode or the vertical electric field mode is applicable as a driving method for the above-mentioned liquid crystal layer. A fringe field switching (FFS) mode and an in-plane switching (IPS) mode are examples of the horizontal electric field mode. A twisted nematic (TN) mode, a vertical alignment (VA) mode, and an electrically controlled birefringence (ECB) mode are examples of the vertical electric field mode.

A general liquid crystal display device with a touch sensor includes a display area corresponding to a screen of a panel unit, and a frame portion disposed outside the display area. The display area is a region constituted by pixels and touch detection units. The frame portion is formed with, for example, a peripheral circuit. The peripheral circuit is formed by a process such as a chip-on-glass (COG) process or a low-temperature polycrystalline silicon (LTPS) process. The peripheral circuit is, for example, a driver that drives electrodes of the panel. Examples of the driver include, but are not limited to, a gate driver that drives gate electrodes and gate lines.

General issues and requirements in devices such as the above-described liquid crystal display device with a touch sensor includes, for example, thickness reduction, space saving, simplification in the production process and the number of parts, cost reduction by simplification, and improvement in quality of display and accuracy of touch detection. Regarding particularly the simplification, the number of layers is reduced to reduce cost by employing the combined use type in-cell configuration in which the electrodes and the wiring layers are used for both of the different functions as illustrated in the above-described configuration example. In addition, there are special requirements on space saving: the display area and a touch detection area corresponding to the display area are desirable to be as large as possible, and the frame portion and the like are desirable to be as small as possible, relative to the overall size of the device. Regarding the accuracy of touch detection, the screen serving as the touch detection area is desirable to have an appropriate and uniform degree of sensitivity of touch detection.

Related art examples regarding the above-described liquid crystal display device with a touch sensor includes Japanese Patent Application Laid-open No. 2012-73783. Japanese Patent Application Laid-open No. 2012-73783 describes how to obtain a display device with a touch detection function that is capable of enhancing uniformity in sensitivity of detection of touch. In particular, Japanese Patent Application Laid-open No. 2012-73783 describes that a plurality of drive electrodes extends to a first position or a second position located outside of the first position, the first position being away from the center of a touch detection electrode located outermost among a plurality of touch detection electrodes disposed in an effective display region S, by half the length of an arrangement pitch of the touch detection electrodes.

In the related in-cell capacitive liquid crystal touch panel, particularly in the combined use type configuration example (such as Japanese Patent Application Laid-open No. 2009-244958) in which the same electrode unit is used for both the liquid crystal display function and the touch sensor function, the touch detection area corresponding to the display area is desirable to have an appropriate and uniform degree of sensitivity of touch detection.

SUMMARY

According to an aspect, a display device with a touch sensor has a display function and a touch sensor function. The display device includes: a panel unit that comprises a first substrate, a second substrate, and a display function layer between the first substrate and the second substrate; a first electrode on the first substrate having a function as a first touch drive electrode that constitutes the touch sensor function; a second electrode on the second substrate having a function as a second touch drive electrode that constitutes the touch sensor function; a third electrode on the second substrate having a function as a touch detection electrode that constitutes the touch sensor function; and a capacitor for the touch sensor function. The capacitor is formed between either of the first electrode and the second electrode and the third electrode, or between both the first electrode and the second electrode and the third electrode. When the touch sensor function is used, a first signal is applied to the first electrode and the second electrode, and a second signal is detected from the third electrode through the capacitor. The first electrode of the first substrate is disposed in a display area of the panel unit, and the second electrode of the second substrate is disposed in a frame portion outside the display area, and the first electrode and the second electrode are connected to each other by an upper/lower conducting portion provided at the frame portion. The frame portion comprises, on the first substrate side thereof, a peripheral circuit, and the second electrode is provided in a position more distant upward from the peripheral circuit than the first electrode.

According to another aspect, an electronic apparatus includes the display device with a touch sensor.

Additional features and advantages are described herein, and will be apparent from the following Detailed Description and the figures.

BRIEF DESCRIPTION OF THE FIGURES

FIG. 1 is a diagram illustrating a principle of a mutual capacitive touch sensor;

FIG. 2 is a diagram illustrating the principle of the mutual capacitive touch sensor;

FIG. 9 is a cross-sectional view illustrating a schematic configuration of a main part of a panel unit of a liquid crystal display device with a touch sensor of a third embodiment of the present disclosure;

FIG. 10 is a cross-sectional view illustrating a schematic configuration of a main part of a panel unit of a liquid crystal display device with a touch sensor of a fourth embodiment of the present disclosure;

DETAILED DESCRIPTION

Figure 3:
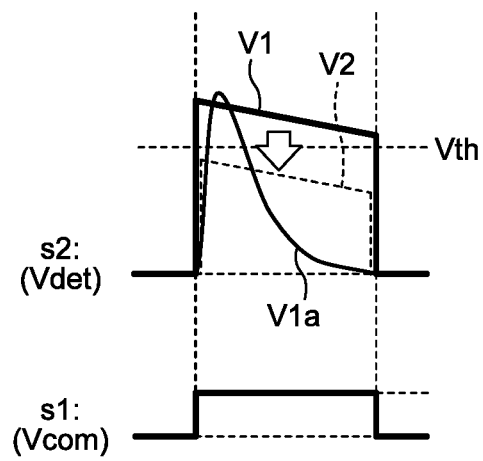
FIG. 3 is a diagram illustrating the principle of the mutual capacitive touch sensor.

Embodiments of the present disclosure will be described below in detail based on the accompanying drawings. In all of the drawings for explaining the embodiments, the same parts will be given the same reference numerals, and repetition of description thereof will be omitted. For convenience of explanation, various directions will be referred to as follows: directions of a panel display plane as the X- and Y-directions; the direction perpendicular thereto (sight-line direction) as the Z-direction; the direction of gate lines as the X-direction; and the direction of source lines as the Y-direction. In addition to reference numerals, abbreviated symbols such as G, S, Tx, and Rx will be used as appropriate. Cross-sectional views are illustrated with hatching lines partially omitted for ease of understanding.

1. LIQUID CRYSTAL DISPLAY WITH TOUCH SENSOR

Before describing the details of the embodiments of the present disclosure, description will be made below of techniques and the like of a liquid crystal display device with a touch sensor, for ease of understanding.

1-1. Touch Panel Principle (1)

FIGS. 1, 2, and 3 are diagrams illustrating a basic principle of a mutual capacitive touch sensor (touch panel). The embodiments of the present disclosure also follow this principle. FIG. 1 is a diagram illustrating a basic structure of the touch sensor. FIG. 2 is a diagram illustrating an equivalent circuit of FIG. 1. FIG. 3 is a diagram illustrating signal voltages at the time of touch detection by the touch sensor of FIGS. 1 and 2. The touch sensor may be called "input/output device" in the present specification.

A touch panel T illustrated in FIG. 1 includes a touch drive electrode E1 (transmitting electrode Tx) and a touch detection electrode E2 (receiving electrode Rx) that are arranged opposed to each other with a dielectric body D interposed therebetween. The touch drive electrode E1, the touch detection electrode E2, and the dielectric body D form a capacitive element. In the present specification, the capacitive element is represented as a capacitor C1. The touch panel T has a mechanism of detecting a state as to whether touching is made by utilizing a change in electrostatic capacitance of the capacitor C1 caused by approaching of a conductive body M, such as a finger, to a surface on the side of the touch detection electrode E2. As illustrated in FIG. 2, one end (on the side of the touch drive electrode E1) of the capacitor C1 is connected to an alternating-current signal source AS, and the other end thereof (point p, on the side of the touch detection electrode E2) is grounded via a resistor R and connected to a voltage detector DET. For providing a touch sensor function, a voltage of a signal (touch drive signal) s1 given by an alternating-current rectangular wave is applied from the alternating-current signal source AS to the touch drive electrode E1. As a result, a current flows via the capacitor C1, and thus, the voltage detector DET on the side of the touch detection electrode E2 detects a voltage of a signal s2, which is a touch detection signal. As illustrated in FIG. 3, the signal s1 as an input is a voltage signal given by the alternating-current rectangular wave having a predetermined frequency. The signal s2 (detected voltage Vdet) as an output changes to a voltage V1 when no touch is made and to a voltage V2 when a touch is made.

In the state in which the conductive body M is not close to the touch detection electrode E2 on the front surface side of the touch panel T, input of the signal s1 causes the capacitor C1 to charge and discharge, so that a current I1 corresponding to the capacitance value of the capacitor C1 flows therethrough. At this time, the potential waveform (waveform of the detected voltage Vdet) of the touch detection electrode E2 at the other end (point p) of the capacitor C1 is detected by the voltage detector DET, illustrated as the voltage V1 of the signal s2. The potential waveform has a substantially constant value of the voltage V1 while the conductive body M is not close to the touch detection electrode E2. The actual waveform of the voltage V1 has a form of decaying after steep rising, illustrated as a voltage V1a.

In the state in which the conductive body M is close to the touch detection electrode E2 on the front surface side of the touch panel T (in a touch-on state), the circuit takes a form in which a capacitor C2 formed by the conductive body M is additionally connected in series to the capacitor C1. In this state, the current I1 and a current I2 flow corresponding to the capacitance values of the capacitors C1 and C2, respectively, as the respective capacitors C1 and C2 are charged and discharged. At this time, the potential waveform (waveform of the detected voltage Vdet) of the touch detection electrode E2 at the other end (point p) of the capacitor C1 detected by the voltage detector DET changes to the voltage V2 of the signal s2 due to reduction of the electric field caused by the conductive body M. The above-described potential at the point p (touch detection electrode E2) results in a potential of a divided voltage determined by the values of the currents I1 and I2 flowing the capacitors C1 and C2. Consequently, when the conductive body M is close to the touch detection electrode E2, the voltage V2 of the signal s2 has a value lower than the voltage V1 obtained when the conductive body M is not close to the touch detection electrode E2. The voltage detector DET (or a touch detection circuit corresponding thereto) compares the detected voltage Vdet (voltage V1 or V2) of the signal s2 with a predetermined threshold voltage Vth, and detects the state as the state in which the conductive body M is close to the touch detection electrode E2 when the detected voltage Vdet is lower than the threshold voltage Vth, for example, as illustrated as the voltage V2 in FIG. 3. The state may be detected by determination through comparison of an amount of change in the voltage from V1 to V2 with a predetermined threshold value.

1-2. Touch Panel Principle (2)

Figure 4:
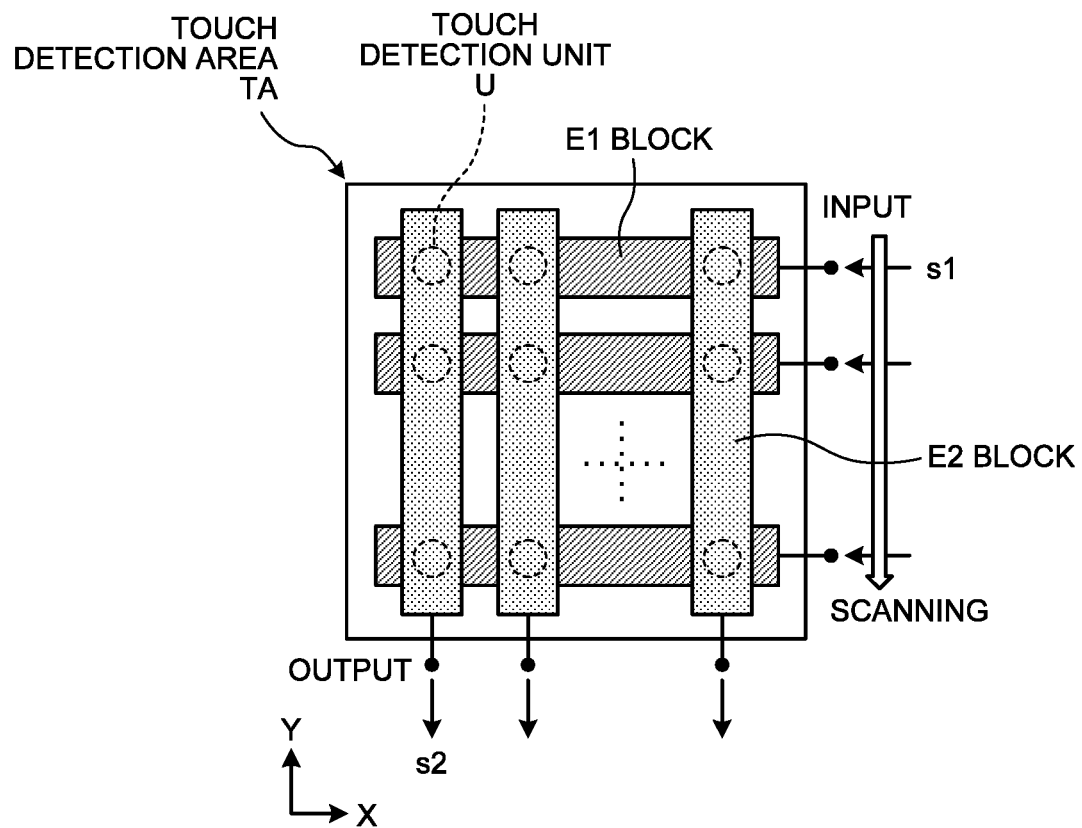
FIG. 4 is a diagram illustrating a configuration example of touch detection units of the touch sensor.

FIG. 4 is a diagram illustrating a configuration example of a touch detection area in the touch panel T and touch detection units U included in the touch detection area. A plane (defined by the X- and Y-directions) constituting this touch detection area TA includes a wiring pattern of the touch drive electrode E1 (transmitting electrode Tx) and a wiring pattern of the touch detection electrode E2 (receiving electrode Rx), and capacitors C1 formed at respective intersections of these patterns constitute the touch detection units U. For example, the touch drive electrode E1 (transmitting electrode Tx) is a plurality of lines extending in parallel in the X-direction of a surface of a first substrate, and the touch detection electrode E2 (receiving electrode Rx) is a plurality of lines extending in parallel in the Y-direction of a surface of a second substrate. The lines of the touch drive electrode E1 and the touch detection electrode E2 can be configured, for example, as blocks (E1 blocks and E2 blocks) each corresponding to a plurality of pixel lines of the liquid crystal display device. For example, one or more touch positions (that is, the touch detection units U corresponding to the touch positions) in the touch detection area can be detected by calculation processing based on the signal s2 detected (output) from the E2 blocks in response to the signal s1 sequentially applied (scanned) from a driver to the E1 blocks.

Not limited to the above-described configuration example, the touch drive electrode E1 (transmitting electrode Tx) may be formed as a solid layer on the surface of the first substrate, and the touch detection electrode E2 (receiving electrode Rx) may be formed in a matrix in units of regions divided in the X-direction and the Y-direction on the surface of the second substrate. The resolution of the touch detection is governed by the design of the above-described pattern. In the present specification, the "solid layer" refers to a layer that is not processed into a predetermined shape after deposition.

1-3. TFT Liquid Crystal Pixel Configuration

Figure 5:
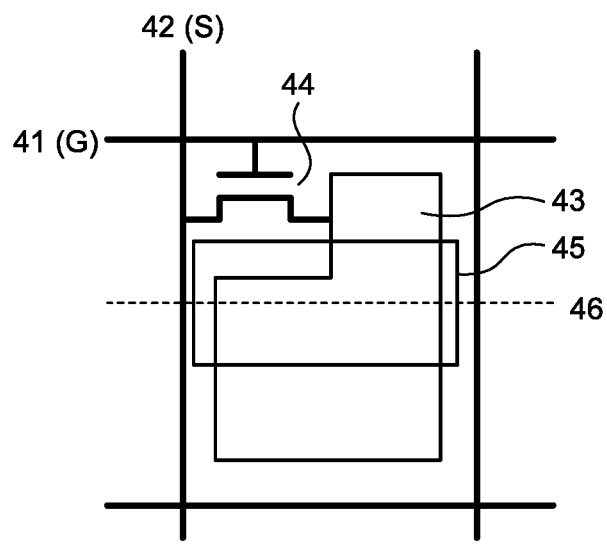
FIG. 5 is a diagram illustrating a configuration of a pixel (cell) of a TFT-LCD.
Figure 6:
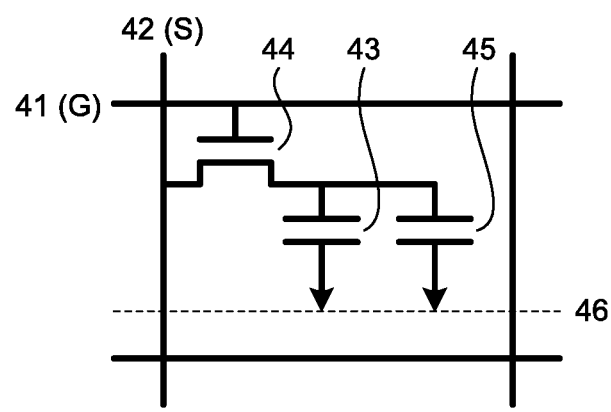
FIG. 6 is a diagram illustrating the configuration of the pixel (cell) of the TFT-LCD.

FIG. 5 is a diagram illustrating a configuration of a pixel (cell) of a TFT-LCD. FIG. 6 is a diagram illustrating an equivalent circuit corresponding to FIG. 5. As illustrated in FIG. 5, the pixels (cells) are formed in a matrix by intersection of gate lines 41 (referenced as G) extending in parallel in the transverse (X) direction and source lines 42 (referenced as S) extending in parallel in the longitudinal (Y) direction. Each of the gate lines 41 (gate lines G) is connected to a gate electrode of a TFT 44, and each of the source lines 42 (source lines S) is connected to a source electrode of the TFT 44. A pixel electrode 43 is connected to a drain electrode of the TFT 44. The respective pixels include retention capacitors 45, which are connected to retention capacitor lines 46 extending in parallel in the X-direction (or to a common electrode). In the equivalent circuit illustrated in FIG. 6, one terminal of each of the pixel electrode 43 and the retention capacitor 45 is connected to the drain electrode, and the other terminal of each of the pixel electrode 43 and the retention capacitor 45 is connected to the retention capacitor line 46, to which a common voltage is supplied.

1-4. Liquid Crystal Display with In-Cell Touch Sensor (Non-Combined Use Type)

A structure (liquid crystal display device with an in-cell touch sensor [in-cell touch LCD]) can include the touch panel T built inside the liquid crystal display panel. As a driving method for an applied liquid crystal layer in a vertical electric field mode, an array substrate that is the first substrate includes a first common electrode unit (COM1), and a CF substrate that is the second substrate includes a second common electrode unit (COM2). In a horizontal electric field mode, the array substrate that is the first substrate includes a common electrode (COM).

1-5. Liquid Crystal Display with In-Cell Touch Sensor (Combined Use Type)

A structure (combined use type in which the same electrode unit is used for both the liquid crystal display function and the touch sensor function) can include the above-described liquid crystal display device with an in-cell touch sensor that is simplified by including a common electrode unit originally provided in the liquid crystal display device also as one of the electrodes (touch drive electrode E1) constituting the touch sensor function (for example, in Japanese Patent Application Laid-open No. 2009-244958). A common drive signal (common voltage) to the common electrode for the liquid crystal display device is commonly used also as a signal for the touch sensor. As a driving method, signals for the respective functions are applied to the same electrode unit on a time-sharing basis (in FIGS. 18A to 18E to be described below).

In the case of the combined use type in the vertical electric field mode (such as the TN, the VA, or the ECB mode), the structure is such that the first common electrode unit (COM1) on the array substrate is used commonly (for combined use) as the touch drive electrode (transmitting electrode Tx) for the touch sensor function, and the second common electrode unit (COM2) on the CF substrate is used commonly (for combined use) as the touch detection electrode (receiving electrode Rx). In the vertical electric field mode, the common drive signal (common voltage) to the upper and the lower common electrode units (the common electrode COM1 and the common electrode COM2) and a pixel signal of the pixel electrode generate an electric field VE in the vertical direction (Z-direction) with respect to the liquid crystal layer so as to control (modulate) the state of each pixel.

In the case of the combined use type in the horizontal electric field mode (such as the FFS or the IPS mode), the structure is such that the first common electrode unit (COM) on the array substrate is used commonly (in other words, used for combined use) as the touch drive electrode (transmitting electrode Tx) for the touch sensor function, and the touch detection electrode (receiving electrode Rx) is provided on the CF substrate. In the horizontal electric field mode, the common drive signal (common voltage) to the common electrode COM and the pixel signal of the pixel electrode generate an electric field HE in the horizontal direction (X- or Y-direction) with respect to the liquid crystal layer so as to control (modulate) the state of each pixel.

1-6. Problems of Related Art

However, the study by the inventor of the present disclosure has found that the display device with a touch sensor of related art has the following problems. Those problems will be described using FIGS. 32 and 33.

Figure 32:
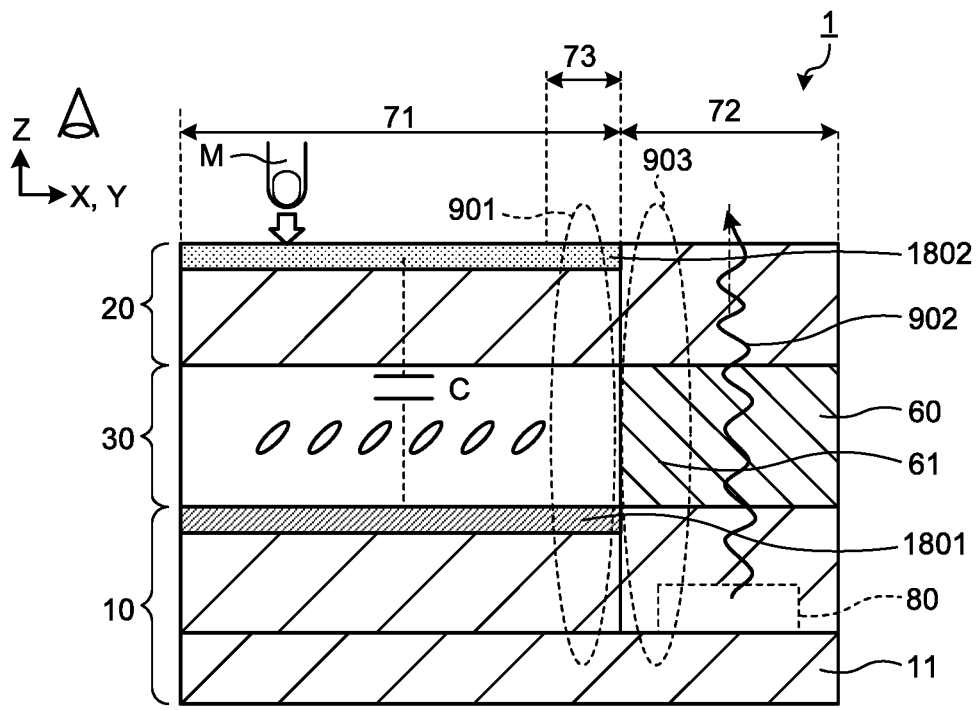
FIG. 32 is an explanatory diagram schematically illustrating a cross-sectional configuration of a related liquid crystal display device with a touch sensor.

FIG. 32 schematically illustrates a cross-sectional configuration of the related liquid crystal display device with a touch sensor. The related liquid crystal display device with a touch sensor includes broadly divided three regions of an array substrate 10, a liquid crystal layer 30, and a CF substrate 20, which are arranged in the Z-direction. The array substrate 10 includes a glass substrate 11 and components, such as gate electrodes G, source electrodes S, pixel electrodes, and retention capacitors, which are not illustrated. The CF substrate 20 includes a glass substrate, a color filter, and the like, which are not illustrated. The related liquid crystal display device with a touch sensor also includes two regions of a display area 71 and a frame portion 72 located outside thereof, which are arranged in the X- and Y-directions and illustrated in a divided manner. The display area 71 is a region that is constituted by pixels and touch detection units and that corresponds to the screen and also to the touch detection area. The frame portion 72 is a region that is provided in a frame-like manner outside the display area 71 and that is basically not formed with pixels or touch detection units. In other words, the frame portion 72 is a non-display area. Reference numeral 60 indicates a sealing portion that seals the liquid crystal layer 30. Lines (region) of a touch drive electrode 1801 (transmitting electrode Tx) that is an element constituting the touch sensor function are particularly included in the display area 71, for example, on the surface on the inner side (on the side nearer to the liquid crystal layer 30) of the array substrate 10. Lines (region) of a touch detection electrode 1802 (receiving electrode Rx) that is an element constituting the touch sensor function are included in the display area 71, for example, on the surface (front surface) on the outer side (on the side farther from the liquid crystal layer 30) of the CF substrate 20. Reference numeral C indicates a capacitance provided by the transmitting electrode Tx and the receiving electrode Rx that are an electrode pair constituting the touch sensor function. The capacitance C is an electrostatic capacitance for the touch detection. The inclined ellipses in the liquid crystal layer 30 are schematic representation of liquid crystal molecules. There is no limitation here in the driving method, that is, as to whether the vertical electric field mode or the horizontal electric field mode is used. The region of the frame portion 72 includes an area in which a peripheral circuit 80 is formed or implemented. As the peripheral circuit 80, for example, a driver circuit such as a gate driver is formed in a place such as on the glass substrate 11 on the side of the array substrate 10 in the frame portion 72. The peripheral circuit 80 is formed by a process such as the COG process or the LTPS process mentioned above.

A first problem is that an end portion 73 (a region 901) adjacent to the frame portion 72) in the display area 71 tends to have a slightly lower degree of sensitivity of touch detection than that of a central portion (a region apart from the frame portion 72) in the display area 71. In other words, the touch detection area has room for improvement in the uniformity of the sensitivity of touch detection.

The lower sensitivity of touch detection described above is attributed to the fact that the structure of the electrode units and others configuring the pixels and the touch detection units in the display area 71, particularly in the end portion 73 differs from the structure in the frame portion 72 located outside the display area 71, particularly in a region 903 adjacent to the display area 71. For example, the frame portion 72 (region 903) is not formed with the touch drive electrode 1801 (transmitting electrode Tx) and the touch detection electrode 1802 (receiving electrode Rx) that are the electrode pair constituting the touch sensor function. Otherwise, even if the touch drive electrode 1801 and the touch detection electrode 1802 serving as the electrode pair are formed, the electrodes are ends of lines and have small electrode widths. For that reason, in the end portion 73 (region 901) of the display area 71, only a weak fringe electric field is generated between the touch drive electrode 1801 and the touch detection electrode 1802 serving as the electrode pair; in other words, the number of lines of electric force is smaller, and thus the sensitivity of touch detection is slightly lower.

Figure 33:
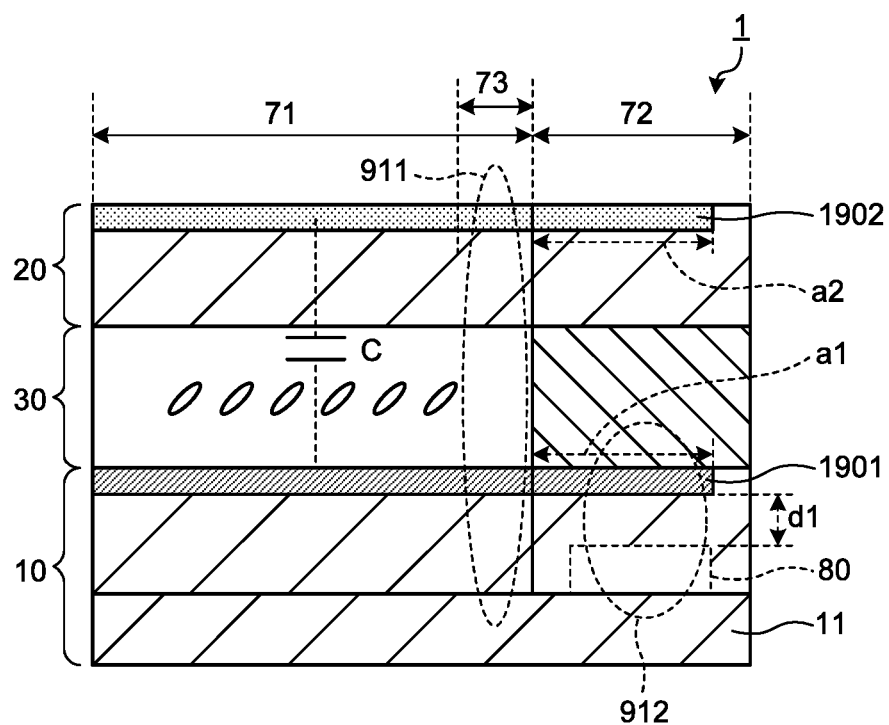
FIG. 33 is an explanatory diagram schematically illustrating a cross-sectional configuration of a related liquid crystal display device with a touch sensor.

FIG. 33 illustrates, as a way of solving the above-described first problem, a configuration in which a touch drive electrode 1901 and a touch detection electrode 1902 that are electrode units lying in the display area 71, particularly in the end portion 73, are extended into the frame portion 72, as illustrated in a region 911 adjacent to the frame portion 72, an extended region a1, and an extended region a2. In other words, the touch drive electrode 1901 (transmitting electrode Tx) of the array substrate 10 is extended into the frame portion 72, and the touch detection electrode 1902 (receiving electrode Rx) of the corresponding CF substrate 20 is extended into the frame portion 72. The extended region a1 is provided in the frame portion 72 so as to provide the transmitting electrode Tx extending from the display area 71 into the frame portion 72 on the array substrate 10. In the same manner, the extended region a2 is provided in the frame portion 72 so as to provide the receiving electrode Rx extending from the display area 71 into the frame portion 72 on the CF substrate 20. This provides the same structure of components such as the touch drive electrode 1901 and the touch detection electrode 1902 serving as the electrode units so as to provide the same effects of the fringe electric field, etc. in the vicinity of the end portion 73 (at the boundary with the frame portion 72) of the display area 71. Therefore, the sensitivity of touch detection in the end portion 73 (region 911) is improved, and thus, the uniformity of the touch detection sensitivity is enhanced in the touch detection area corresponding to the display area 71. In other words, an effective touch detection area can be enlarged by an amount of extension of the electrode units. Only one electrode of the transmitting electrode Tx and the receiving electrode Rx may be extended. However, it is more preferable to have both electrodes of the transmitting electrode Tx and the receiving electrode Rx extended.

Conventional configuration examples of Japanese Patent Application Laid-open No. 2012-73783, for example, describe configurations in which the touch drive electrode (common electrode) in the display area (effective display region) is extended into the frame portion as described above. Such a configuration reduces the amount of reduction of the fringe electric field in the end portion of the display area, so that the fringe electric field has the same intensity as that of the central portion of the display area, and thus enhances the uniformity of the touch detection sensitivity in the end portion of the display area. For example, FIG. 4 and Paragraph 0034 in Japanese Patent Application Laid-open No. 2012-73783 describe this. Enhancing the uniformity of the touch detection sensitivity can reduce, for example, the amount of correction calculation for touch detection signals, and can raise the accuracy of detection of a touch position.

However, as illustrated in FIG. 33, configuring the electrode units of the display area 71 to extend into the frame portion 72 reduces distances between the extended electrode units in the frame portion 72 and the peripheral circuit 80, particularly a distance d1 between the transmitting electrode Tx and the peripheral circuit 80, as illustrated in a region 912. This generates a capacitive load due to coupling of the electrode units, particularly the transmitting electrode Tx, with the peripheral circuit 80, and can thereby generate adverse effects. For example, adverse effects can be exerted on operations of the peripheral circuit 80, for example on driving of the electrodes. Adverse effects can also be exerted on elements other than the peripheral circuit 80, such as some kind of electrode wires, if any.

As described above, to prevent degradation in the sensitivity of touch detection in the end portion 73 of the display area 71, the liquid crystal display device with an in-cell capacitive touch sensor preferably has a configuration in which the electrodes constituting the touch sensor function are extended into the end portion 73 located outside the touch detection area corresponding to the display area. However, there is a concern of the adverse effects due to proximity to the peripheral circuit 80 caused by such a configuration. Therefore, it is needed to provide a configuration that can avoid the adverse effects due to proximity to the peripheral circuit 80 caused by extension of the electrode units, particularly the transmitting electrode Tx, etc., from the display area 71 into the frame portion 72, and that can improve or raise the touch detection sensitivity in the display area 71 including the end portion 73.

A second problem is that, as indicated by arrow 902 in FIG. 32, there is a possibility of adverse effects due to noise such as electromagnetic waves emitted from the peripheral circuit 80 implemented on the side of the array substrate 10 of the frame portion 72 toward the front surface (in the Z-direction, or the vertical direction).

As illustrated in FIG. 33, as a way of solving the above-described second problem, there can be exemplified a configuration that shields and reduces the noise from the peripheral circuit 80 indicated by arrow 902 mentioned above, by arranging some kinds of electrode unit and wiring layer in an overlapping manner above (in the Z-direction of) the peripheral circuit 80. For example, a configuration is such that the electrode unit (transmitting electrode Tx) on the side of the array substrate 10 of the display area 71 is extended into the frame portion 72 so as to overlap the peripheral circuit 80 as illustrated by the extended region a1. However, as described above, this configuration reduces the distance d1 between the extended electrode unit and the peripheral circuit 80 in the frame portion 72, so that there is the possibility of the adverse effect of generating the capacitive load due to coupling of the electrode unit with the peripheral circuit 80. For example, a configuration is such that the receiving electrode Rx that is the electrode unit on the side of the CF substrate 20 of the display area 71 is extended into the frame portion 72 so as to overlap the peripheral circuit 80 as illustrated by the extended region a2. A configuration can also be considered in which, for example, the frame portion 72 is widely extended in the X- and Y-directions so as to provide a noise shielding effect at upper/lower conducting portions, etc. between the side of the array substrate 10 and the side of the CF substrate 20. For example, the frame portion 72 may be provided with a layer (noise shielding layer) exclusively for shielding the noise. To provide the noise shielding effect described above, a certain pattern may be formed with wires made of Indium Tin Oxide (ITO) or metal.

Therefore, it is also needed to provide a configuration that can shield the noise from the peripheral circuit 80 toward the front surface while avoiding the mutual adverse effects between the electrode units and the peripheral circuit 80.

As described above, it is a main object of the present disclosure to provide a technique regarding an in-cell capacitive liquid crystal touch panel (particularly of a combined use type), the technique being capable of avoiding adverse effects due to proximity to a peripheral circuit caused by extension of electrode units from a display area into a frame portion, and capable of improving and/or raising the touch detection sensitivity of the touch detection area corresponding to the display area including an end portion thereof. Other problems and the like will be described in embodiments of the present disclosure.

2. FIRST EMBODIMENT

Based on the description given above, an in-cell capacitive liquid crystal touch panel 1 of a first embodiment of the present disclosure will be described using FIG. 7, for example. Against the above-described problems (FIGS. 32 and 33), the first embodiment (FIG. 7) has a configuration in which, when the electrode unit (transmitting electrode Tx) on the side of the array substrate 10 of the display area 71 and the corresponding electrode unit (receiving electrode Rx) of the CF substrate 20 are extended into the frame portion 72, the electrode unit on the side of the array substrate 10 is extended toward the CF substrate 20 so as to be separated from the peripheral circuit 80 located on the side of the array substrate 10. In other words, the configuration is such that a first electrode 51 (transmitting electrode Tx1) arranged mainly in the display area 71 of the array substrate 10 and a second electrode 52 (transmitting electrode Tx2) extended in the frame portion 72 of the CF substrate 20 are connected at an upper/lower conducting portion 61 of the frame portion 72. This configuration improves and/or raises the touch detection sensitivity and enhances uniformity of the touch detection sensitivity in the end portion 73 of the touch detection area corresponding to the display area 71 as indicated by a dotted line A1. In addition, the electrode units (transmitting electrode Tx2 and receiving electrode Rx) extended in the frame portion 72 provide the effect of shielding the noise from the peripheral circuit 80 toward the front surface as indicated by a dotted line A2.

In the present configuration, the first electrode 51 (transmitting electrode Tx1) formed in the display area 71 on the inner side (on the side nearer to the liquid crystal layer 30) of the array substrate 10 is slightly extended into the frame portion 72, and to be connected from there, through the upper/lower conducting portion 61 in the frame portion 72, to the second electrode 52 (transmitting electrode Tx2) that is a wiring layer formed (extended) on the inner side (on the side nearer to the liquid crystal layer 30) of the CF substrate 20 in the frame portion 72. The first electrode 51 (transmitting electrode Tx1) and the second electrode 52 (transmitting electrode Tx2) have a function of the touch drive electrode (transmitting electrode Tx). The outer side (front surface) of the CF substrate 20 includes the touch detection electrode (receiving electrode Rx) as a third electrode 53 in a manner extending from the display area 71 into the frame portion 72. In the present configuration, the second electrode 52 (transmitting electrode Tx2) located on the upper side is extended more outward (in the X- or Y-direction) than the first electrode 51 (transmitting electrode Tx1) located on the lower side.

As described above, the extended portion from the first electrode 51 (transmitting electrode Tx1) in the display area 71 of the array substrate 10 is provided as the second electrode 52 (transmitting electrode Tx2) in the frame portion 72 of the CF substrate 20. Therefore, as indicated by the dotted line A2, a larger distance d2 (d2>d1) is obtained above (in the Z-direction of) the peripheral circuit 80 to the electrode unit (particularly, to the second electrode 52 [transmitting electrode Tx2]) extended in the frame portion 72. This can reduce the capacitive load caused by coupling of the second electrode 52 with the peripheral circuit 80. Consequently, for example, the above-described adverse effects on operations of the peripheral circuit 80 can be avoided. The touch detection sensitivity can be improved by the structure that includes, near the end portion 73 of the display area 71, the transmitting electrode Tx2 and the receiving electrode Rx that are the electrodes extended in the frame portion 72, as indicated by the dotted line A1. Although the present configuration (FIG. 7) has a vertical difference due to whether the touch drive electrode (transmitting electrode Tx) is present near the end portion 73 of the display area 71, the liquid crystal layer 30 actually has a thickness smaller than those of the array substrate 10 and the CF substrate 20 that are upper and lower substrates, and therefore, an effect of improvement in the touch detection sensitivity exists.

In the present configuration, the transmitting electrode Tx2 that is the electrode unit extended at the distance d2 above (in the Z-direction of) the peripheral circuit 80 in the frame portion 72 of the array substrate 10 is arranged so as to overlap the receiving electrode Rx. This configuration with the electrode units (particularly, with the transmitting electrode Tx2) provides the effect of being capable of shielding the noise from the peripheral circuit 80 toward the front surface.

2-1. Liquid Crystal Display with Touch Sensor

A description will be made using FIG. 7 of a schematic configuration of a main part of a panel unit 1 of the liquid crystal display device with a touch sensor of the first embodiment. The panel unit 1 of the liquid crystal display device with a touch sensor includes the array substrate 10 and the CF substrate 20 that are arranged opposed to each other with the liquid crystal layer 30 interposed therebetween. The driving method for the liquid crystal layer 30 is not limited. A sealing portion 60 of the frame portion 72 connects the array substrate 10 and the CF substrate 20 that are the upper and the lower substrates to each other, and seals the liquid crystal layer 30. The array substrate 10 includes the gate lines G, the source lines S, etc., which are not illustrated.

The first electrode 51 (transmitting electrode Tx1) is formed of ITO or the like on the inner side (on the side nearer to the liquid crystal layer 30) of the array substrate 10 mainly in the display area 71. The second electrode 52 (transmitting electrode Tx2) is formed of ITO or the like on the inner side (on the side nearer to the liquid crystal layer 30) of the CF substrate 20 in the frame portion 72, and the third electrode 53 (receiving electrode Rx) is formed of ITO or the like on the outer side (front surface) over the display area 71 and the frame portion 72. The first electrode 51 (transmitting electrode Tx1) has a function of a first touch drive electrode (transmitting electrode Tx1) for the touch sensor function. The second electrode 52 (transmitting electrode Tx2) has a function of a second touch drive electrode (transmitting electrode Tx2) for the touch sensor function. The third electrode 53 (Rx) has a function of the touch detection electrode (receiving electrode Rx) for the touch sensor function. The transmitting electrodes Tx (transmitting electrodes Tx1 and Tx2) and the receiving electrode Rx form a pair to constitute the capacitance C for touch detection.

Figure 7:
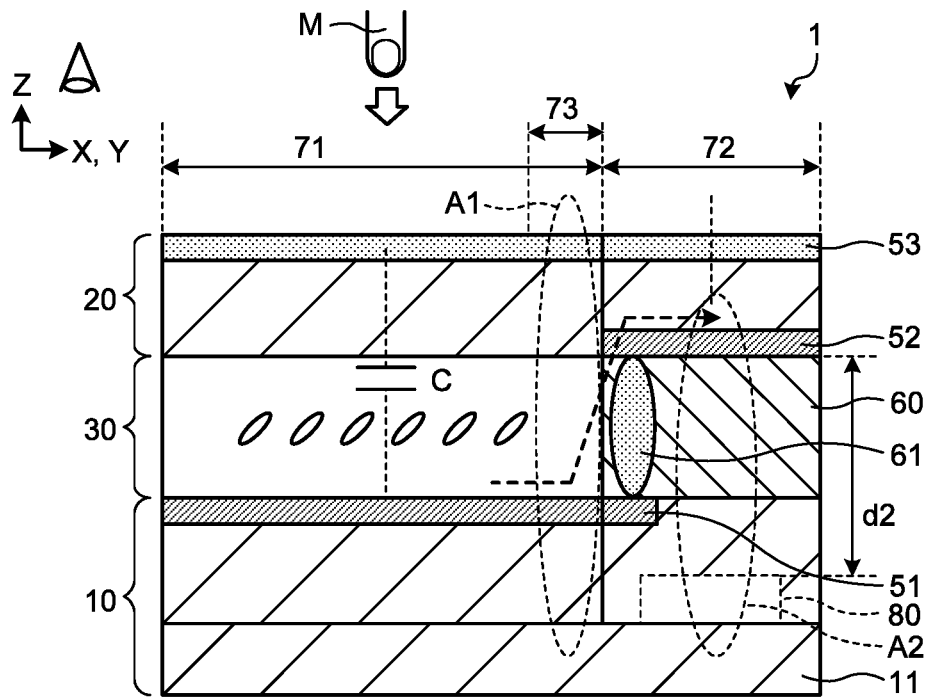
FIG. 7 is a cross-sectional view illustrating a schematic configuration of a main part of a panel unit of a liquid crystal display device with a touch sensor of a first embodiment of the present disclosure.

In FIG. 7, the transmitting electrode Tx2 and the receiving electrode Rx are electrodes that are extended to the outermost part of the frame portion 72. Therefore, the touch detection is possible in the frame portion 72. In other words, the touch detection area includes the display area 71 and the frame portion 72.

One end of the first electrode 51 (transmitting electrode Tx1) of the array substrate 10 and one end of the second electrode 52 (transmitting electrode Tx2) of the CF substrate 20 are electrically connected by the upper/lower conducting portion 61 of the frame portion 72. The upper/lower conducting portion 61 may be formed as a part of the sealing portion 60, or may be formed independently. Supplying a common voltage Vcom gives the transmitting electrodes Tx1 and Tx2, which are electrically connected, a common potential. For example, the sealing portion 60 having the sealing function is used also as the upper/lower conducting portion 61 having the electrical connection function.

The peripheral circuit 80, etc. such as a driver connected to the gate lines G are implemented on the side of the array substrate 10 of the frame portion 72. While, here, the peripheral circuit 80 is illustrated inside the array substrate 10, circuit elements are formed on the substrate according to implementation details as described above. The driver, etc. connected to the transmitting electrode Tx2 or the receiving electrode Rx, which is the electrode on the side of the CF substrate 20, may be implemented in the frame portion 72 on the side of the CF substrate 20, or may be implemented in the frame portion 72 on the side of the array substrate 10 so as to be connected via wiring, the upper/lower conducting portion, or the like. In particular, the driver, etc. are preferably collectively implemented as the peripheral circuit 80 on the side of the array substrate 10.

The transmitting electrode Tx2 and the receiving electrode Rx, which are the electrode units extended in the frame portion 72 on the side of the CF substrate 20, have also the function of shielding the noise from the peripheral circuit 80, etc. located therebelow toward the front surface, depending on the wiring patterns of the electrodes Tx2 and Rx. For example, the noise shielding effect is obtained when the transmitting electrode Tx2 has a shape of stripes in a first direction and the receiving electrode Rx has a shape of stripes in a second direction.

In the present configuration of the panel unit 1 of the liquid crystal display device with a touch sensor illustrated in FIG. 7, the third electrode 53 (receiving electrode Rx) is disposed on the outer side (front surface) of the CF substrate 20. This disposition increases the distance between the receiving electrode Rx and the transmitting electrodes Tx (transmitting electrodes Tx1 and Tx2) so as to keep the capacitance value of the capacitance C constituted by the electrode pair from being excessively large. The third electrode 53 (receiving electrode Rx) can be disposed basically in any desired position (layer). In another configuration of the liquid crystal display device with a touch sensor, the third electrode 53 (receiving electrode Rx) may be disposed on the side of the array substrate 10. In a still other configuration of the liquid crystal display device with a touch sensor, the third electrode 53 (receiving electrode Rx) may be disposed on the surface on the inner side (on the side nearer to the liquid crystal layer 30) of the CF substrate 20.

2-2. Modification 1A

Figure 21:
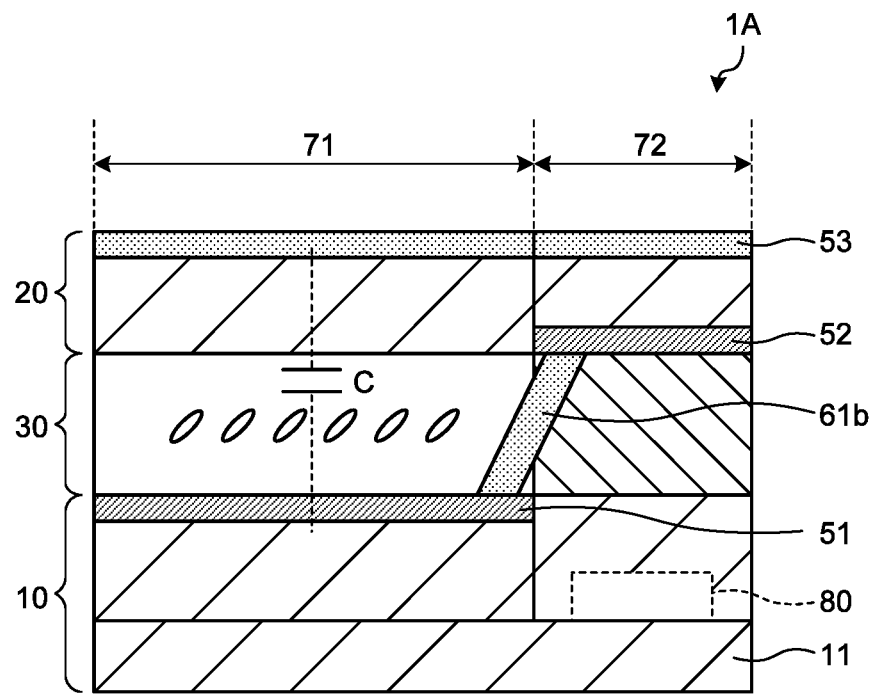
FIG. 21 is a diagram illustrating a modification (1A) of the first embodiment.

FIG. 21 illustrates Modification 1A of the first embodiment. This configuration is configured to dispose the first electrode 51 (transmitting electrode Tx1) on the side of the array substrate 10 only inside the display area 71, to dispose the second electrode 52 (transmitting electrode Tx2) on the side of the CF substrate 20 only inside the frame portion 72, and to obliquely dispose an upper/lower conducting portion 61*b* that connects the ends of the transmitting electrode Tx1 and the transmitting electrode Tx2, which are the first electrode 51 and the second electrode 52, to each other. The upper/lower conducting portion 61*b* is not limited to have a form of being disposed vertically (in the Z-direction) inside the frame portion 72 as described above, but only needs to have a shape that can connect the transmitting electrodes Tx1 and Tx2, which are the upper and the lower electrode units, to each other, such as the oblique shape of the present configuration. The present configuration provides the same effect as that of the first embodiment.

3. SECOND EMBODIMENT

Figure 8:
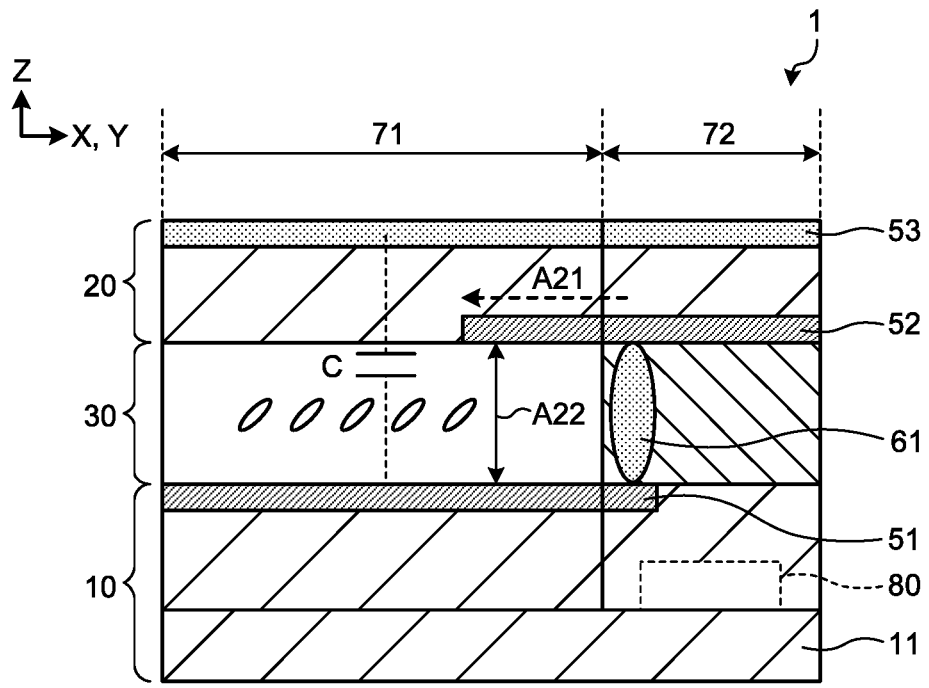
FIG. 8 is a cross-sectional view illustrating a schematic configuration of a main part of a panel unit of a liquid crystal display device with a touch sensor of a second embodiment of the present disclosure.

A description will next be made using FIG. 8 of a panel unit 1 of a liquid crystal display device with a touch sensor of a second embodiment of the present disclosure. In the second embodiment, the second electrode 52 (transmitting electrode Tx2), which is extended in the frame portion 72 on the side of the CF substrate 20, in the first embodiment is extended also toward the display area 71 as indicated by arrow A21. In other words, the second embodiment includes the first electrode 51 (transmitting electrode Tx1) mainly in the display area 71 of the array substrate 10, the second electrode 52 (transmitting electrode Tx2) on the surface on the inner side of the CF substrate 20 over the frame portion 72 and a part of the display area 71, and the third electrode 53 (receiving electrode Rx) on the surface on the outer side of the CF substrate 20 over the display area 71 and the frame portion 72; and connects the transmitting electrodes Tx1 and Tx2 through the upper/lower conducting portion 61 of the frame portion 72. This configuration configures the transmitting electrodes Tx1 and Tx2 to be parallel to each other in the display area 71 as indicated by arrow A22. In other words, the transmitting electrodes Tx1 and Tx2 overlap each other in the Z-direction in the display area 71. The configuration of the transmitting electrodes Tx1 and Tx2 being parallel as indicated by arrow A22 provides a lower resistance. The transmitting electrodes Tx1 and Tx2 have a combined resistance, and thus have in effect a lower resistance as drive electrodes.

3-1. Modification 2A

Figure 22:
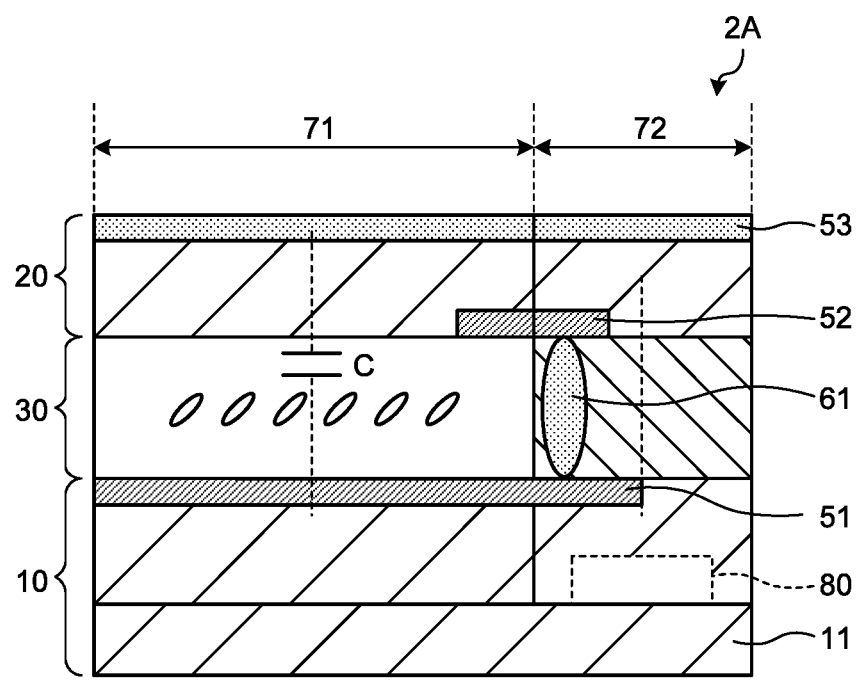
FIG. 22 is a diagram illustrating a modification (2A) of the second embodiment.

FIG. 22 illustrates Modification 2A of the second embodiment. In this configuration, between the first electrode 51 (transmitting electrode Tx1) and the second electrode 52 (transmitting electrode Tx2), which are extended into the frame portion 72, the transmitting electrode Tx2 has a smaller extension length in the X- or Y-direction than that of the transmitting electrode Tx1. The transmitting electrode Tx1 is disposed more outward than the transmitting electrode Tx2. Although the distance between the transmitting electrode Tx1 and the peripheral circuit 80 is slightly smaller, the present configuration also provides an effect close to that of the first and the second embodiments.

3-2. Modification 2B

Figure 23:
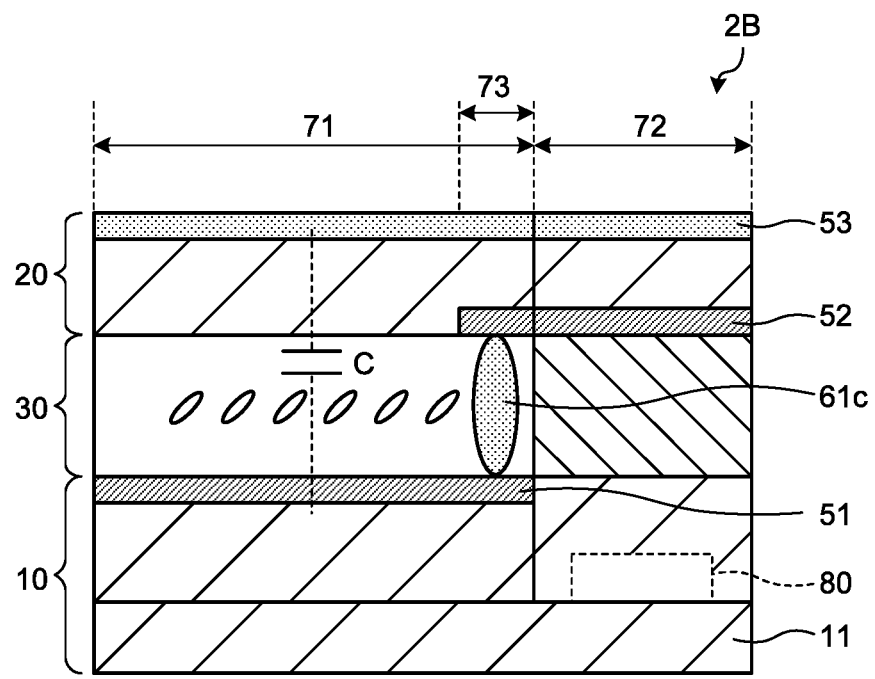
FIG. 23 is a diagram illustrating a modification (2B) of the second embodiment.

FIG. 23 illustrates Modification 2B of the second embodiment. In this configuration, an upper/lower conducting portion 61*c* (contact conducting column) connecting the first electrode 51 (transmitting electrode Tx1) with the second electrode 52 (transmitting electrode Tx2) is formed not in the frame portion 72 but in the display area 71 (end portion 73). Therefore, the second electrode 52 (transmitting electrode Tx2) is extended not only in the frame portion 72 but also slightly into the display area 71. The first electrode 51 (transmitting electrode Tx1) is not extended into the frame portion 72. The present configuration also provides an effect close to that of the first and the second embodiments.

4. THIRD EMBODIMENT

A description will next be made using FIG. 9 of a panel unit 1 of a liquid crystal display device with a touch sensor of a third embodiment of the present disclosure. The third embodiment is an embodiment that applies the vertical electric field mode as a method for the liquid crystal layer 30, and limits the configuration to that of the combined use type. The vertical electric field mode refers to a method of driving the liquid crystal layer using the electric field in the vertical direction applied between the upper and the lower substrates. An up/down arrow in the liquid crystal layer 30 indicates the vertical electric field mode. The first electrode 51 and the second electrode 52 are of the combined use type. The first electrode 51 has a combination of a function as the first common electrode unit (COM1) in the liquid crystal display function and a function as the first touch drive electrode (transmitting electrode Tx1) in the touch sensor function. In a similar manner, the second electrode 52 has a combination of a function as the second common electrode unit (COM2) in the liquid crystal display function and a function as the second touch drive electrode (transmitting electrode Tx2) in the touch sensor function. The second electrode 52 serving as the transmitting electrode Tx2 and as the common electrode unit COM2 is extended over the display area 71 and the frame portion 72 as indicated by arrows A31. The touch drive electrodes (particularly, the transmitting electrode Tx2) and the touch detection electrode (receiving electrode Rx) form a pair to constitute the capacitance C for touch detection.

The first electrode 51 serving as the transmitting electrode Tx1 and as the first common electrode unit COM1 is formed on the surface on the inner side of the array substrate 10 mainly in the display area 71, and the pixel electrode 43 is formed above the first electrode 51 with an insulation layer interposed therebetween. The pixel electrode 43 is an electrode for generating the vertical electric field VE. The second electrode 52 serving as the transmitting electrode Tx2 and as the second common electrode unit COM2 is formed on the surface on the inner side of the CF substrate 20 over the display area 71 and the frame portion 72. The third electrode 53 (receiving electrode Rx) is correspondingly formed on the surface on the outer side of the CF substrate 20 over the display area 71 and the frame portion 72. The pixel electrode 43 is included in a position (layer) between the transmitting electrodes Tx1 and Tx2. The transmitting electrode Tx1 forms the above-described terminals of the retention capacitor 45 for each pixel. The transmitting electrode Tx1 includes, for example, the retention capacitor line 46 to which the terminal is connected.

As a driving method corresponding to the third embodiment, waveforms for the respective functions are applied on a time-sharing basis. Specifically, during a pixel writing period in one horizontal period, the common voltage Vcom for the common electrodes COM (first common electrode unit COM1 and second common electrode unit COM2) is supplied to the first electrode 51 and the second electrode 52, whereas during a touch sensing period, the signal s1 serving as the touch drive signal for the transmitting electrodes Tx (transmitting electrodes Tx1 and Tx2) is applied and the signal s2 serving as the touch detection signal is correspondingly output (detected) from the third electrode 53 (receiving electrode Rx).

The third embodiment also provides the same effect as that of the first and the second embodiments.

5. FOURTH EMBODIMENT

A description will next be made using FIG. 10 of a panel unit 1 of a liquid crystal display device with a touch sensor of a fourth embodiment of the present disclosure. The fourth embodiment is an embodiment that applies the horizontal electric field mode as a method for the liquid crystal layer 30, and limits the configuration to that of the combined use type. The horizontal electric field mode refers to a method of driving the liquid crystal layer using the electric field HE in the horizontal direction applied along one of the upper and the lower substrates. The electric field in the horizontal direction is generated in a direction substantially parallel to an in-plane direction of the upper or the lower substrate. A right/left arrow in the liquid crystal layer 30 indicates the horizontal electric field mode. The first electrode 51 and the second electrode 52 are of the combined use type. The first electrode 51 has a combination of a function as the first common electrode COM1 in the liquid crystal display function and a function as the first touch drive electrode (Tx1) in the touch sensor function. The second electrode 52 has a function as the second touch drive electrode (transmitting electrode Tx2) in the touch sensor function. The touch drive electrodes (transmitting electrodes Tx1 and Tx2) and the touch detection electrode (receiving electrode Rx) form a pair to constitute the capacitance C for touch detection.

As a driving method corresponding to the fourth embodiment, waveforms for the respective functions are applied on a time-sharing basis. Specifically, during the pixel writing period, the common voltage Vcom for the first common electrode COM1 is supplied to the first electrode 51, whereas during the touch sensing period, the signal s1 serving as the touch drive signal for the transmitting electrodes Tx (transmitting electrodes Tx1 and Tx2) is applied and the signal s2 serving as the touch detection signal is correspondingly output (detected) from the third electrode 53 (receiving electrode Rx).

In the case of the horizontal electric field mode, the configuration of FIG. 10 has the pixel electrode 43 above the first electrode 51. However, the pixel electrode 43 can be placed below the first electrode 51. In the case of the horizontal electric field mode, the second electrode 52 is not disposed in the display area 71 and is not used as a common electrode. In addition, the retention capacitor 45 described above is not included.

The fourth embodiment also provides the same effect as that of the first embodiment.

6. FIFTH EMBODIMENT

A description will next be made using FIGS. 11 and 12 of a panel unit 1 of a liquid crystal display device with a touch sensor of a fifth embodiment of the present disclosure. The fifth embodiment illustrates a more detailed configuration example based on the first and the third embodiments. The liquid crystal layer 30 employs the vertical electric field mode (for example, a semi-transmissive ECB mode is applied) and has a configuration of the combined use type.

6-1. Liquid Crystal Display with Touch Sensor

Figure 11:
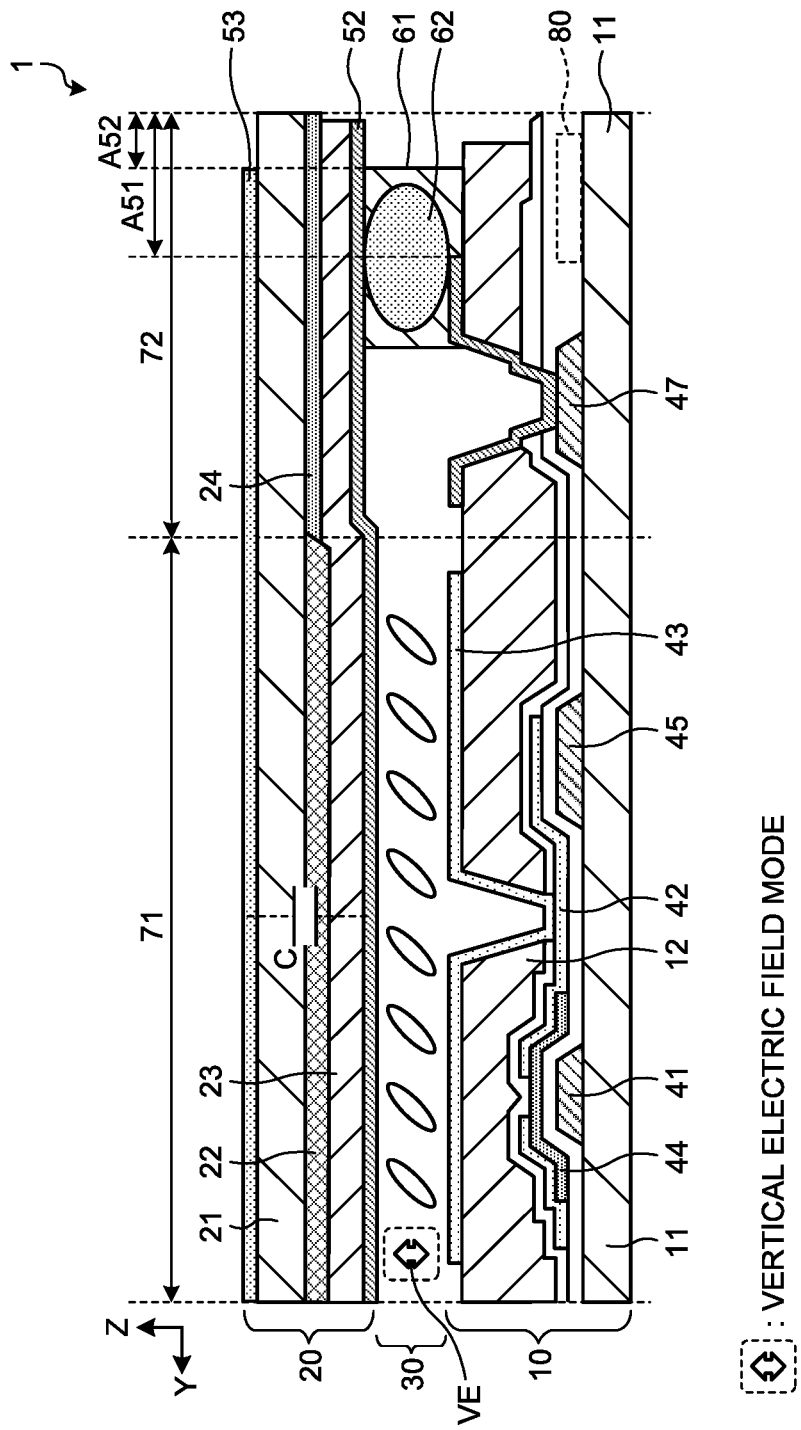
FIG. 11 is a cross-sectional view illustrating a configuration of a panel unit of a liquid crystal display device with a touch sensor of a fifth embodiment of the present disclosure.

FIG. 11 illustrates a cross-sectional (Y-Z) structure of a main part of the panel unit 1 of the liquid crystal display device with a touch sensor of the fifth embodiment. The array substrate 10 includes, on the glass substrate 11, gate electrodes 41, source electrodes 42, the pixel electrodes 43, the TFTs 44, the retention capacitors 45, a common electrode (wiring laid for common electrode) 47, an insulation layer 12, etc. The gate electrodes 41 may include the gate lines G; the source electrodes 42 may include the source lines S; and the common electrode 47 may include wiring laid for the common electrode. The glass substrate 11 in the frame portion 72 includes thereon an area in which the peripheral circuit 80 (such as a gate selection circuit) is implemented. The first electrode 51 serving as the transmitting electrode Tx1 and as the common electrode COM1 includes (in other words, is connected to) the wiring laid for the common electrode 47, terminals of the retention capacitors 45, etc.

The CF substrate 20 includes, on a glass substrate 21 (on the side of the liquid crystal layer 30), a color filter 22, an overcoat 23, a light-shielding film 24, the second electrode 52, etc., and includes the third electrode 53 on the outer side (front surface) of the glass substrate 21. The light-shielding film 24 is also called a black matrix (BM). The color filter 22 is, for example, a pattern of a periodic array of colors of red (R), green (G), and blue (B). Each color corresponds to one pixel (subpixel). The overcoat 23 covers the color filter 22. The light-shielding film 24 is formed at the frame portion 72.

FIG. 11 illustrates only a part of the display area 71 for one pixel. The display area 71 illustrated in FIG. 11 is divided from the frame portion 72 as a region in which the color filter 22, the pixel electrodes 43, etc. are formed. The frame portion 72 includes the upper/lower conducting portion 61 above the insulation layer 12. The upper/lower conducting portion 61 contains conductive particles 62 dispersed in sealing material. One end of the first electrode 51 is connected to one end of the second electrode 52 by the upper/lower conducting portion 61, more specifically, by the conductive particles 62. The upper/lower conducting portion 61 seals the liquid crystal layer 30. The upper/lower conducting portion 61 is provided apart from the peripheral circuit 80 with the insulation layer 12 interposed on the side of the array substrate 10.

The first electrode 51 serving as the transmitting electrode Tx1 and as the common electrode COM1, the second electrode 52 serving as the transmitting electrode Tx2 and as the common electrode COM2, and the third electrode 53 serving as the receiving electrode Rx are configured to form a pattern of transparent electrodes made of ITO or the like. For example, the transmitting electrodes Tx (transmitting electrodes Tx1 and Tx2) are formed into stripes in the X-direction, and the receiving electrode Rx is formed into stripes in the Y-direction.

In a region indicated by arrow A51 in the frame portion 72, the second electrode 52 serving as the transmitting electrode Tx2 and as the common electrode COM2 is extended more widely outward (in the X- or Y-direction) than the first electrode 51 serving as the transmitting electrode Tx1 and as the common electrode COM1, and has a part overlapping the peripheral circuit 80. Consequently, the second electrode 52 has the effect of shielding the noise of the peripheral circuit 80 as described above. In a region indicated by arrow A52, the second electrode 52 serving as the transmitting electrode Tx2 and as the common electrode COM2 is extended more widely outward (in the X- or Y-direction) than the third electrode 53 serving as the receiving electrode Rx and the upper/lower conducting portion 61.

6-2. Plan Configuration of Substrate

Figure 12:
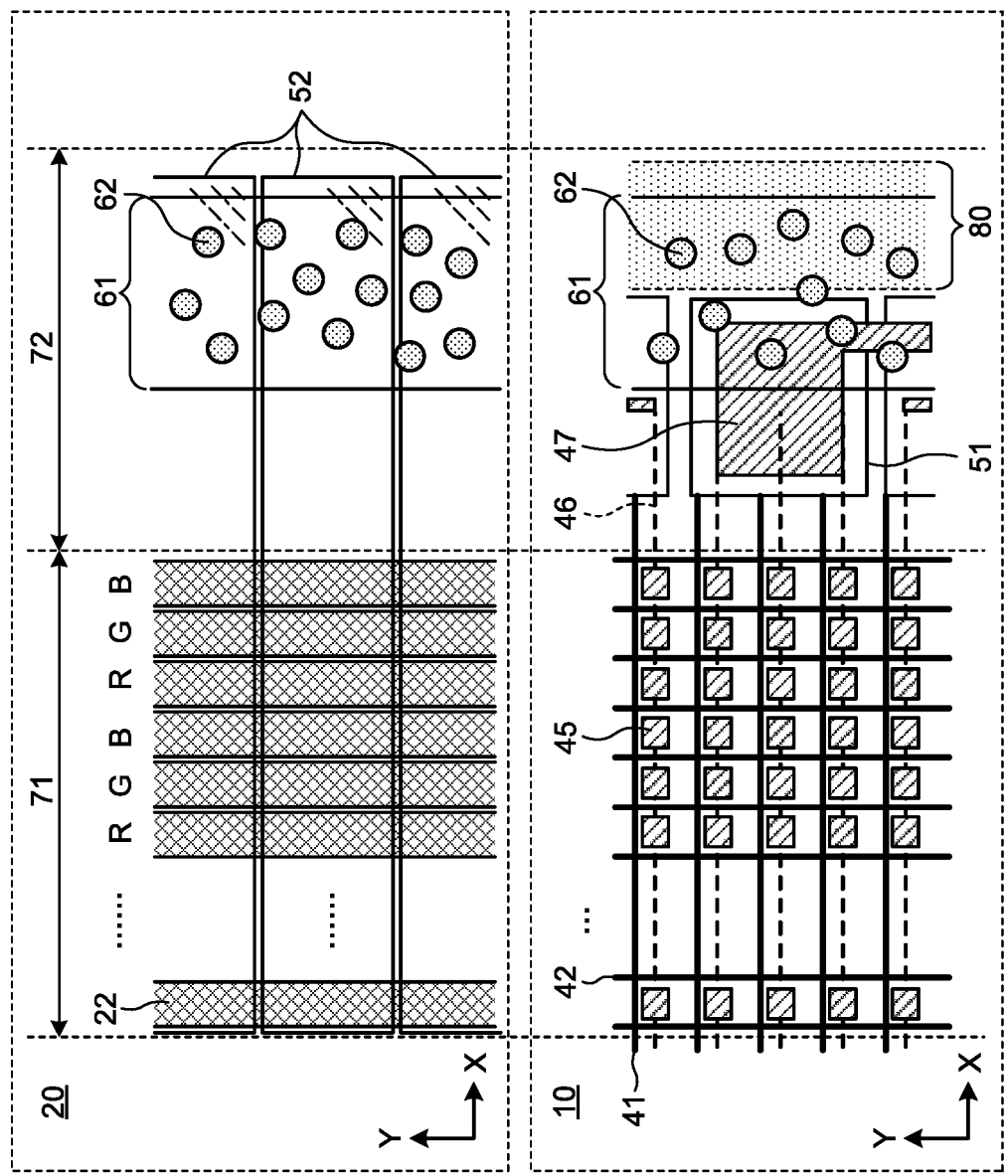
FIG. 12 is a diagram illustrating a plan configuration example of upper and lower substrates of the liquid crystal display device with a touch sensor of the fifth embodiment.

FIG. 12 illustrates a plan (X-Y) configuration example of the substrates (the array substrate 10 and the CF substrate 20) of the panel unit 1 of the liquid crystal display device with a touch sensor of the fifth embodiment. FIG. 12 illustrates an X-Y plane on the side of the CF substrate 20 and an X-Y plane on the side of the array substrate 10. As viewed on the X-Y plane on the side of the CF substrate 20 illustrated in FIG. 12, the pattern of the color filter 22 (R, G, and B) is arranged in the display area 71. A range of the upper/lower conducting portion 61 is indicated in the frame portion 72, and the conductive particles 62 are disposed in a dispersed manner in the range. The second electrode 52 serving as the transmitting electrode Tx2 and as the common electrode COM2 is formed of ITO in a pattern formed like stripes extending in parallel in the X-direction. One line of the transmitting electrode Tx2 can form one block including a plurality of pixel lines, for example.

As viewed on the X-Y plane on the side of the array substrate 10 illustrated in FIG. 12, the panel unit 1 includes, on the side of the substrate 10, an array of pixels formed by the gate lines 41 (gate lines G) extending in parallel in the X-direction and the source lines 42 (source lines S) extending in parallel in the Y-direction. The pixels include each the retention capacitor 45 and are connected by the retention capacitor lines 46 extending in parallel in the X-direction to each other and to the common electrode (wiring laid for common electrode) 47. The terminals of the retention capacitor 45, the retention capacitor lines 46, and the common electrode 47 constitute a part of the first electrode 51 (transmitting electrode Tx1). The panel unit 1 includes an area for the peripheral circuit 80 (such as the gate selection circuit) in the vicinity of the common electrode 47 and the first electrode 51 (transmitting electrode Tx1). As described above, there is a portion, above the area for the peripheral circuit 80, overlapping the second electrode 52 serving as the transmitting electrode Tx2 and as the common electrode COM2.

7. SIXTH EMBODIMENT

A description will next be made using FIGS. 13 to 16 of a panel unit 1 of a liquid crystal display device with a touch sensor of a sixth embodiment of the present disclosure. The sixth embodiment provides a structure having pattern shapes of the transmitting electrodes Tx and the receiving electrode Rx, which constitute the touch sensor function, the pattern shapes being further contrived based on the vertical electric field mode liquid crystal display device with a touch sensor of the combined use type described in the fifth embodiment. Employing the configuration of the fifth embodiment or the like, or a configuration of a related vertical electric field mode causes the second touch drive electrode (transmitting electrode Tx2) to overlap the gate lines G. Depending on implementation details, it becomes a problem that a large capacitive load is produced between the gate lines 41 (gate lines G) of the array substrate 10 and the second touch drive electrode (transmitting electrode Tx2) of the CF substrate 20. Therefore, the sixth embodiment employs a configuration in which shapes of the transmitting electrode Tx pattern and the corresponding receiving electrode Rx pattern are contrived as described below so as to reduce the capacitive load produced between the gate lines 41 (gate lines G) of the array substrate 10 and the second touch drive electrode (transmitting electrode Tx2) of the CF substrate 20, and thus enhancing liquid crystal orientation and quality of display.

In the related configuration of the vertical electric field mode, the touch drive electrode provided on the CF substrate is a solid layer of ITO, and an opposed ITO layer that is a touch drive electrode resides in a position overlapping a gate electrode on the array substrate. Consequently, a capacitive load increases between the gate electrode on the array substrate and the opposed ITO layer serving as a touch drive electrode on the CF substrate. In other words, the capacitive load between the gate electrode on the array substrate and the opposed ITO layer serving as a touch drive electrode on the CF substrate is large. Therefore, the configuration of the sixth embodiment is a configuration in which the shape of the transmitting electrode Tx pattern is contrived so as to avoid the increase in the capacitive load, and is a configuration in which this pattern shape prevents a disorder in the liquid crystal orientation from appearing on the display.

Figure 13:
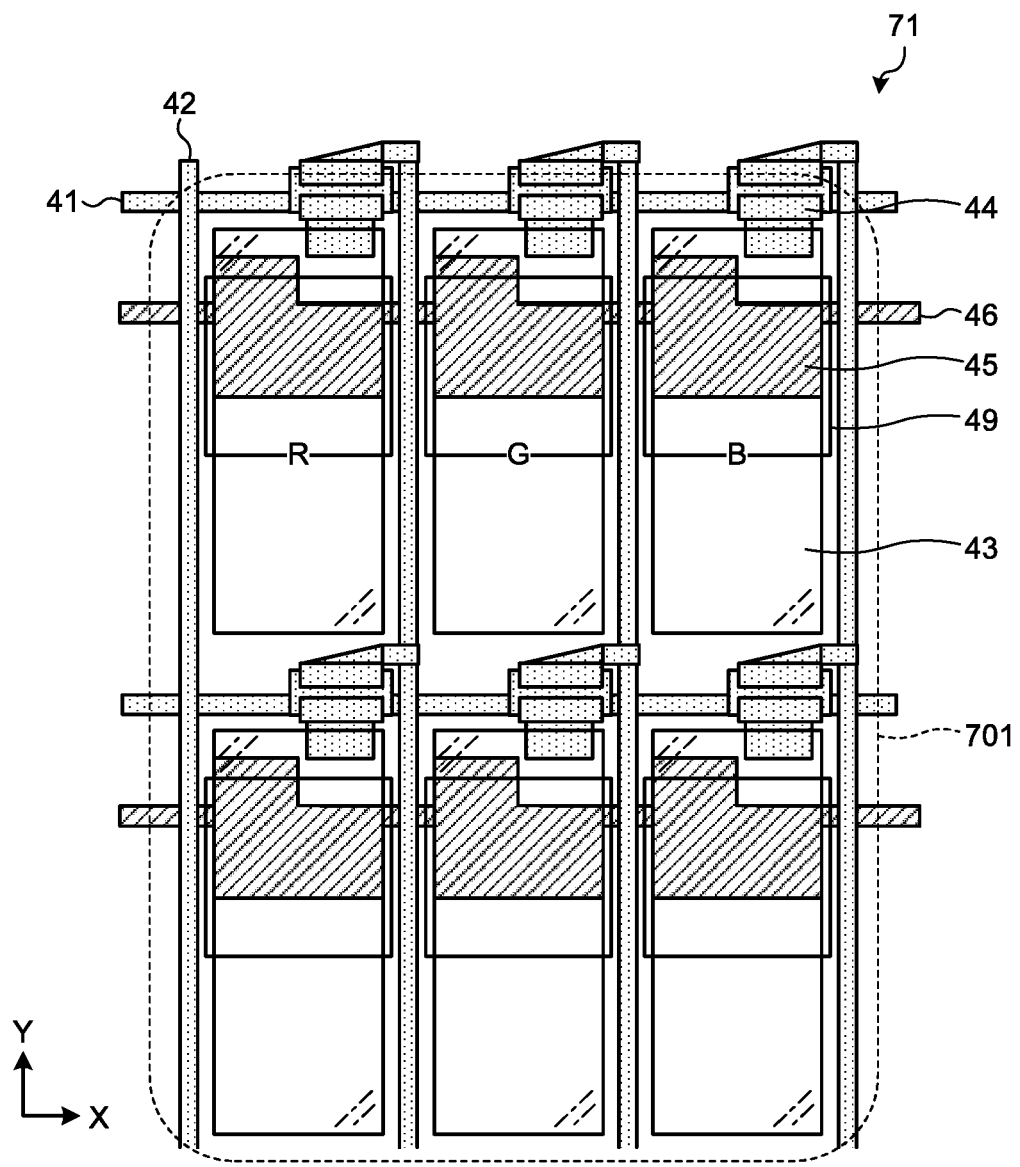
FIG. 13 is a plan view illustrating a pixel configuration of a panel unit of a liquid crystal display device with a touch sensor of a sixth embodiment of the present disclosure.
Figure 14:
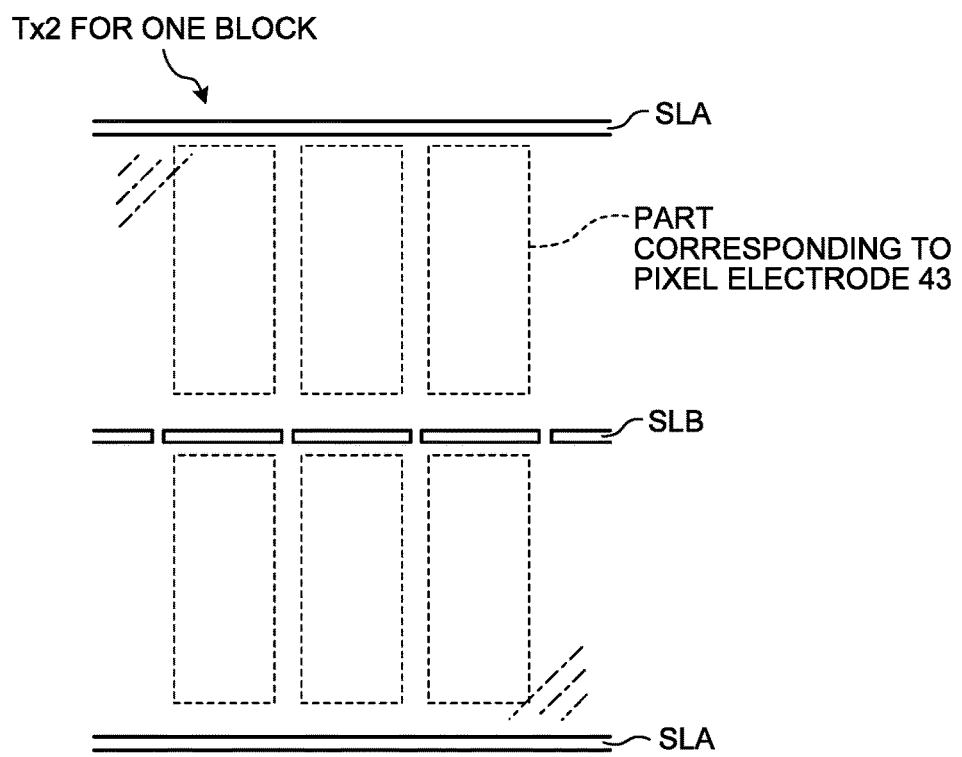
FIG. 14 is a plan view illustrating a pattern configuration example of a second electrode of the liquid crystal display device with a touch sensor of the sixth embodiment.

In the sixth embodiment, the pattern of the second electrode 52 (transmitting electrode Tx2) as illustrated in FIG. 14 overlaps a pixel configuration of the display area 71 as illustrated in FIG. 13. This provides a structure in which slits SLA that are slits of the second transmitting electrode Tx2 pattern overlap the positions of the gate lines G. This structure reduces the capacitive load between the gate lines G and the second touch drive electrode (transmitting electrode Tx2), and enhances the liquid crystal orientation and the quality of display.

7-1. Pixel Configuration

FIG. 13 first illustrates the pixel configuration. The display area 71 includes pixels formed by intersection of the gate lines 41 (gate lines G) extending in parallel in the X-direction and the source lines 42 (source lines S) extending in parallel in the Y-direction. Each of the pixels includes the TFT 44, the pixel electrode 43, the retention capacitor 45, a reflective aluminum plate 49, etc. In the present embodiment, the TFT 44 is an amorphous TFT, but further can be a polycrystalline TFT or a single crystalline TFT. The pixel electrode 43 is connected to the transmitting electrode Tx1 through the retention capacitor line 46. The reflective aluminum plate 49 is an electrode unit that is effective when applied corresponding to (particularly, the semi-transmissive ECB mode of) the vertical electric field mode, but may be omitted. A region 701 illustrates only pixels of two pixel lines corresponding to block divisions of the transmitting electrode Tx2 (FIGS. 14 and 15), each line illustrating only three pixels of R, G, and B in the X-direction.

7-2. Transmitting Electrode Tx2 Pattern

Figure 15:
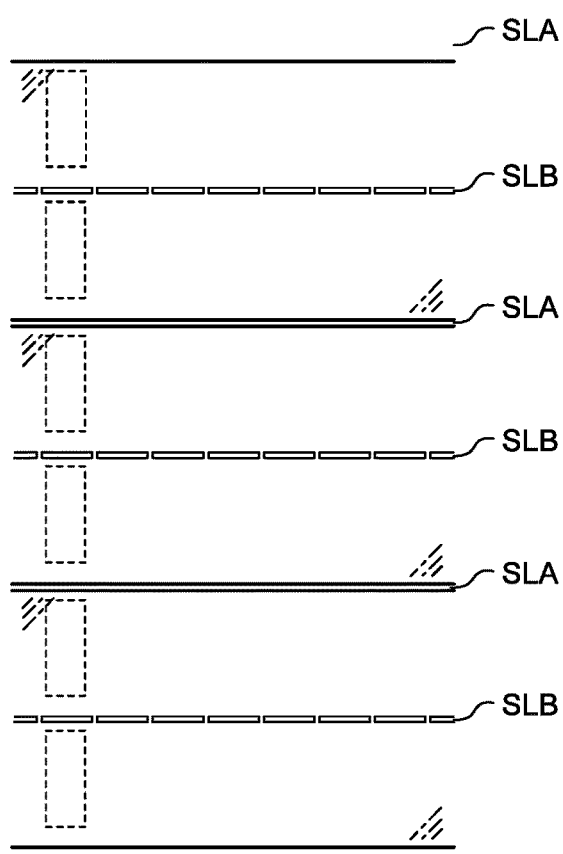
FIG. 15 is a plan view illustrating the pattern configuration example of the second electrode of the liquid crystal display device with a touch sensor of the sixth embodiment.

FIGS. 14 and 15 are diagrams each illustrating the pattern shape of the second electrode 52 (transmitting electrode Tx2). FIG. 14 is a diagram illustrating one block that is a part of the transmitting electrode Tx2. FIG. 14 illustrates, as an example, the region occupied by one block of the transmitting electrode Tx2 and two pixel lines. FIG. 15 is a diagram illustrating three blocks that are a part of the transmitting electrode Tx2. The transmitting electrode Tx2 block of FIG. 14 overlaps a position above and opposed to the region 701. The slits SLA in the X-direction of the transmitting electrode Tx2 are provided so as to overlap the gate lines G in the X-direction. In the present embodiment, the slits SLA are called type 1 slits, or block dividing slits. This constitutes a plurality of blocks (lines) of the transmitting electrode Tx2 extending in parallel in the X-direction. The present configuration example illustrates a case of constituting one transmitting electrode Tx2 block with two pixel lines. In other words, the slits SLA are provided at intervals of every two of the gate lines G. Not limited to this, the transmitting electrode Tx2 blocks may be constituted at intervals of a predetermined number of pixel lines according to, for example, a required resolution of touch detection. Constituting the transmitting electrode Tx2 blocks at intervals of a predetermined number of pixel lines corresponds to forming the slits SLA at intervals of the predetermined number of pixel lines.

Corresponding to the configuration in which the transmitting electrode Tx2 is extended from the display area 71 into the frame portion 72 as described above, the transmitting electrode Tx2 blocks have a shape that continues into the frame portion 72. The configuration of the transmitting electrode Tx2 blocks described above reduces the capacitance between the gate lines G and the transmitting electrode Tx2 in the display area 71, and extends the transmitting electrode Tx2 blocks so as to make them overlap the peripheral circuit 80 in the frame portion 72.

A slit SLB is provided in each of the transmitting electrode Tx2 blocks as illustrated in FIGS. 14 and 15. In the present embodiment, the slit SLB is called a type 2 slit, or a pixel dividing slit. The slit SLB is basically provided in a position overlapping the gate line G in the same manner as the slit SLA, and serves as an open portion in each pixel position in the X-direction corresponding to the pixel configuration of FIG. 13. In other words, the slit SLB is a non-open portion in positions overlapping the source lines S extending in the Y-direction. The configuration of having the slits SLB further reduces the capacitance between the gate lines G and the transmitting electrode Tx2, and enhances the liquid crystal orientation while increasing uniformity of display.

The slit SLB is not limited to have the above-described shape, but may be, for example, an open portion in positions where the gate line G overlaps the source lines S and a non-open portion in other positions on the gate line G. In one block of the second electrode 52 (transmitting electrode Tx2), the pixel lines arranged in the Y-direction are separated by the slit SLB, but are connected at the non-open portions to have an electrically common potential. A non-open portion serving as a place to provide a connection in the Y-direction only needs to be present at some place. As another configuration example, the transmitting electrode Tx2 block may have a structure in which the pixel lines are not connected (because of an open portion) in the display area 71 but connected in the frame portion 72. Alternatively, in the case of placing the blocks separated by the above-described slits at a common potential, the blocks only need to be configured such that the same signal (voltage) is applied to the blocks.

7-3. Slit SLB

Figure 16:
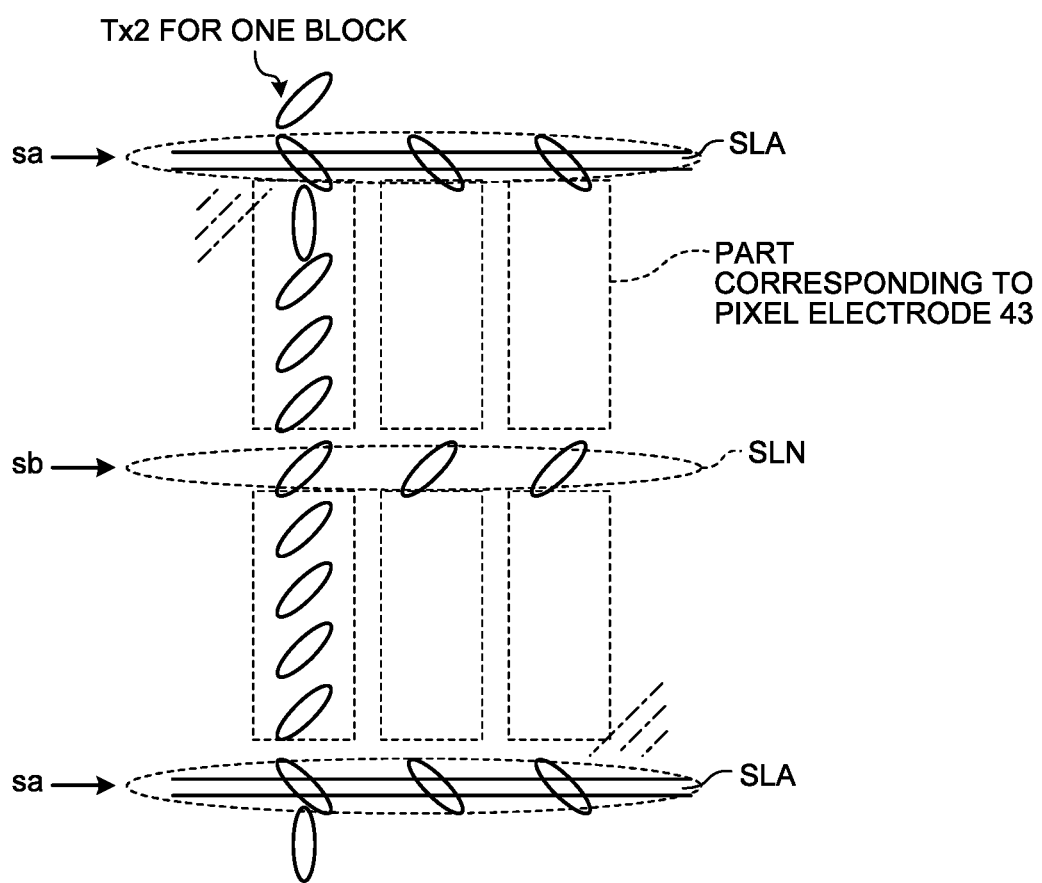
FIG. 16 is a diagram for explaining an effect obtained by a comparative configuration example with respect to the pattern configuration example of the second electrode of FIG. 14.

FIG. 16 is a diagram illustrating effects obtained by existence and nonexistence of the slit SLB in the transmitting electrode Tx2 pattern (block). A region SLN illustrated in FIG. 16 represents a schematic representation of liquid crystal orientation in the case (comparative configuration example) in which the transmitting electrode Tx2 pattern (block) has a shape without the slit SLB. Ellipses are a schematic representation of oriented liquid crystal molecules. In the transmitting electrode Tx2 block, a region sa provided with the slit SLA is placed in a state in which the liquid crystal orientation differs from that of other places (places without the slit SLA), due to electric fields in the pixel electrodes 43 on the side of the array substrate 10 and in the opposed ITO layer, which is the transmitting electrode Tx2 block on the side of the CF substrate 20. This can cause displayed lines to appear in each region sa provided with the slit SLA.

Therefore, as illustrated in FIG. 14, the slit SLB is provided in a region sb without the slit SLA so as to approximate the liquid crystal orientation state of the region provided with the slit SLB to the liquid crystal orientation state of the region sa of the slit SLA. With this configuration, when the displayed lines appear in the region sa of the slit SLA, the lines regularly appear corresponding to line groups of the gate lines G in the X-direction in the display area 71. Therefore, the uniformity of display is achieved.

In a driving method corresponding to the panel unit 1 of the liquid crystal display device with a touch sensor of the sixth embodiment, the signal s1 serving as the touch drive signal is applied to the transmitting electrode Tx1 (retention capacitor lines 46) on the side of the array substrate 10 and to the pattern (blocks) of the transmitting electrode Tx2 on the side of the CF substrate 20 connected to the transmitting electrode Tx1, during the touch sensing period. For example, the signal s1 is sequentially applied to the blocks. In response to this, the signal s2 serving as the touch detection signal is detected from the receiving electrode Rx pattern. The receiving electrode Rx pattern is, for example, of blocks extending in parallel in the Y-direction that correspond to the transmitting electrode Tx pattern in the X-direction.

The third electrode 53 (receiving electrode Rx) of the CF substrate 20 is preferably configured to have a shape corresponding to the pattern of the second electrode 52 (transmitting electrode Tx2). In other words, the receiving electrode Rx pattern is shaped as blocks extending in parallel in the Y-direction so as to intersect (particularly at a right angle) the transmitting electrode Tx pattern (blocks) formed in parallel in the X-direction. The blocks of the receiving electrode Rx can be formed so that one block includes a plurality of pixel lines in the same manner as the blocks of the transmitting electrode Tx2.

In the sixth embodiment, corresponding to the above-described pattern configuration of the transmitting electrode Tx2, in other words, the configuration in which the slit SLA or the slit SLB exists at each pixel line, it is preferable to apply column inversion driving or frame inversion driving as a driving method, that is, as a pixel writing method for the liquid crystal display device. In other words, these driving methods can reduce or prevent the disorder in the liquid crystal orientation at the slit positions, and thus can improve the quality of display.

8. SEVENTH EMBODIMENT

Next, using FIGS. 17 to 20, for example, description will be made, as a seventh embodiment of the present disclosure, of a configuration example of a liquid crystal touch panel module 100 that includes a panel unit 1 of a liquid crystal display device with a touch sensor and driver ICs of the panel unit 1, and of an electronic apparatus 500 that includes the liquid crystal touch panel module 100. In particular, description will be made also of a driving method with respect to the electrodes (transmitting electrodes Tx and receiving electrode Rx) for the touch sensor function corresponding to the fifth embodiment and the like.

8-1. Liquid Crystal Touch Panel Module and Electronic Apparatus

Figure 17:
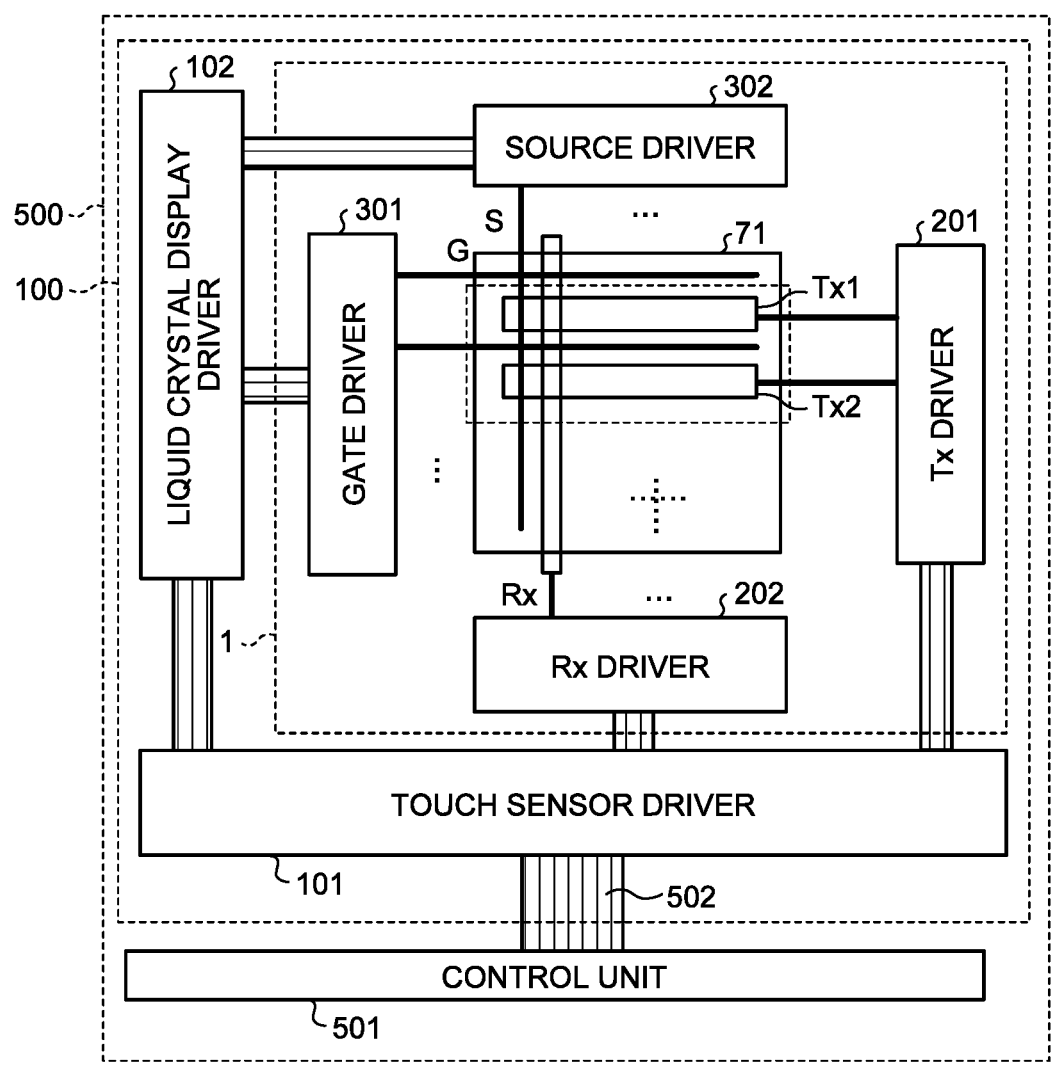
FIG. 17 is a diagram illustrating a functional block configuration of a liquid crystal display device with a touch sensor and of an electronic apparatus of a seventh embodiment of the present disclosure.

FIG. 17 illustrates an example of a functional block configuration of the electronic apparatus 500 including the liquid crystal touch panel module 100 (liquid crystal display device with an in-cell capacitive touch sensor) of the seventh embodiment. The electronic apparatus 500 can be various types of devices that require the liquid crystal display function and the touch sensor function, such as a mobile device, a TV, and a digital camera. The electronic apparatus 500 is equipped with the liquid crystal touch panel module 100 and a control unit 501 connected thereto.

The liquid crystal touch panel module 100 includes the panel unit 1 of the liquid crystal display device with a touch sensor, and a touch sensor driver 101 and a liquid crystal display driver 102 that are connected to the panel unit 1. The touch sensor driver 101 and the liquid crystal display driver 102 can be called as a first controller and a second controller, respectively. The liquid crystal touch panel module 100 and the control unit 501 are connected to each other via an interface 502 (also called I/F) of the touch sensor driver 101. The interface 502 includes an interface of a power supply and an interface of the touch sensor. The touch sensor driver 101 and the liquid crystal display driver 102 are configured to synchronize with each other. The present configuration example uses the touch sensor driver 101, which is the first controller, as a main controller of the liquid crystal touch panel module 100 (the panel unit 1 of the liquid crystal display device with a touch sensor), thereby, in other words, places the touch sensor driver 101 at a level higher than the liquid crystal display driver 102. However, the levels may be inverted or may be integrated into one. Each driver, that is, each of the touch sensor driver 101 and the liquid crystal display driver 102 is implemented, for example, as IC on an FPC board connected to the panel unit 1. These drivers only need to be implemented, for example, by any method such as a chip on film (COF) method.

The panel unit 1 of the liquid crystal display device with a touch sensor is configured, for example, as described in FIG. 11, and includes the display area 71 composed of the pixels and the touch detection units U, the frame portion 72 located outside the display area 71, and drivers connected to the gate lines G, the source lines S, the transmitting electrodes Tx, the receiving electrode Rx, and the like, which are the electrodes or the wires of the display area 71. The panel unit 1 includes, as the drivers, a gate driver 301, a source driver 302, a Tx driver 201 that is a touch drive driver, and an Rx driver 202 that is a touch detection driver. These drivers are implemented by a process such as the COG process or the LTPS process, for example, in the frame portion 72 located outside the display area 71 and/or on the array substrate 10 and the CF substrate 20, which are the upper and the lower glass substrates.

The drives may be separated from each other or integrated with each other, as appropriate. For example, the gate driver 301 and the Tx driver 201 may be integrated into one, and the source driver 302 and the Rx driver 202 may be integrated into one. Alternatively, the Tx driver 201 and/or the Rx driver 202 may be integrated with the touch sensor driver 101, and the gate driver 301 and/or the source driver 302 may be integrated with the LCD driver 102.

The touch sensor driver 101 receives a video signal, etc., from the control unit 501 of the electronic apparatus 500, and performs, for example, timing control for the liquid crystal display driver 102 and touch detection control for the panel unit 1 of the liquid crystal display device with a touch sensor. The touch sensor driver 101, for example, gives the liquid crystal display driver 102 a video signal (image information) and a control signal such as a timing signal. The touch sensor driver 101, for example, also gives the Tx driver 201 and the Rx driver 202 a control signal for the touch detection control. The touch sensor driver 10 gives, as a response, the electronic apparatus 500 information on results of control of several functions (such as information on whether touching is made and/or the touch position).

Based on the control signal from the touch sensor driver 101, the liquid crystal display driver 102 gives the gate driver 301 and the source driver 302 a signal for display control in the display area 71 of the panel unit 1 of the liquid crystal display device with a touch sensor. The signal may be given in the form of connecting the control unit 501 to the liquid crystal display driver 102 to give the video signal, etc. from the control unit 501 to the liquid crystal display driver 102. The gate driver 301 sequentially applies gate signals (scan pulses) to the group of the gate lines 41 (gate lines G). In synchronization therewith, the source driver 302 applies source signals (image signals) to the group of the source lines 42 (source lines S). As a result, the image signals are applied to the pixel electrodes 43 via the TFTs 44. The retention capacitors 45 are charged as soon as the image signals are applied to the pixel electrodes 43. Thus, the state of each pixel of the liquid crystal layer 30 is controlled (modulated).

In accordance with the control signal from the touch sensor driver 101, the Tx driver 201 serving as a touch drive driver supplies the common voltage Vcom for the common electrodes COM and sequentially applies the signal s1 serving as the touch drive signal for the transmitting electrodes Tx to the first electrode 51 and the second electrode 52. It should be noted that the first electrode 51 serves as the transmitting electrode Tx1 and as the common electrode COM1, and that the second electrode 52 serves as the transmitting electrode Tx2 and as the common electrode COM2.

Based on the control signal from the touch sensor driver 101, the Rx driver 202 serving as a touch detection driver detects the signal s2 serving as the touch detection signal from the third electrode 53 (receiving electrode Rx) of the panel unit 1 of the liquid crystal display device with a touch sensor. A signal of a detection result based on the signal s2 serving as the touch detection signal detected by the Rx driver 202 is output to the touch sensor driver 101. The Rx driver 202 receives the signal s2 serving as the touch detection signal from the receiving electrode Rx (third electrode 53), integrates the signal s2, and converts the integrated signal into a digital signal. Based on the digital signal, the Rx driver 202 performs operations such as determination of whether touching is made in the touch detection area corresponding to the display area 71 and calculation of touch position coordinates, and outputs signals indicating the results of the operations. The touch detection circuit provided in the Rx driver 202 is constituted by, for example, an amplifier, a filter, an AD converter, a rectifying and smoothing circuit, and a comparator. An input level signal based on the signal s2 from the receiving electrode Rx is compared with the threshold voltage Vth by the comparator as described above (FIGS. 1 to 3), and as a result, the signal indicating whether touching is made is output.

8-2. Driving Waveform

Figure 18:
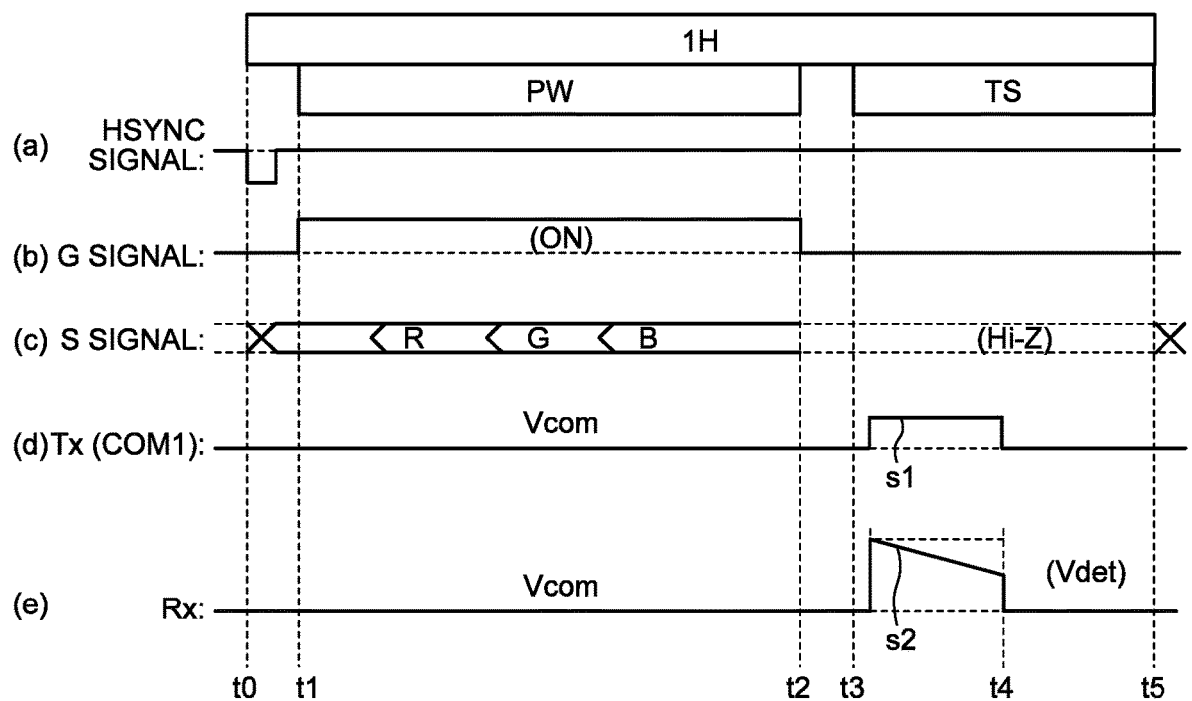
FIG. 18 is a timing chart of driving waveforms of a liquid crystal touch panel module of the seventh embodiment.

FIG. 18 illustrates a timing chart of driving waveforms according to the driving method for the present panel unit 1 of the liquid crystal display device with a touch sensor. The timing charts correspond to the driver configuration of FIG. 17, and the driving waveforms are generated from the respective drivers. In the present driving method, one horizontal period (1 H) is divided into a pixel writing period PW and a touch sensing period TS, and driving is performed on a time-sharing basis between the liquid crystal display function and the touch sensor function. Signals (voltages) corresponding to the respective functions are applied on a time-sharing basis to the first electrode 51 and the second electrode 52, which are the combined-use electrodes. A method such as column inversion driving or frame inversion driving is used to drive the liquid crystal display device.

The drive frequency in each period, that is, in each of the pixel writing period PW and the touch sensing period TS can be designed as appropriate. For example, the drive frequency is set to 60 Hz in the pixel writing period PW, and to a double frequency of 120 Hz in the touch sensing period TS. In other words, in this case, the touch detection is performed at a rate of twice each time an image (pixel) is displayed. The order of the pixel writing period PW and the touch sensing period TS in 1 H may be reversed.

The HSYNC signal of FIG. 18 (a) is a signal that defines 1 H (horizontal period). The G signal of FIG. 18 (b) is a signal that is applied from the gate driver 301 to the gate line 41 (gate line G). The S signal (image signal) of FIG. 18 (c) is a signal that is applied from the source driver 302 to the source line 42 (source line S). Tx (COM1) of FIG. 18 (d) is a signal that is applied from the Tx driver 201 to the first electrode 51 (transmitting electrode Tx1) and the second electrode 52 (transmitting electrode Tx2). Rx of FIG. 18 (e) is a signal that is applied from the Rx driver 202 to the third electrode 53 (receiving electrode Rx).

During the pixel writing period PW, the Tx driver 201 supplies the common voltage Vcom (common drive signal) to the first electrode 51 serving as the transmitting electrode Tx1 and as the common electrode COM1 and to the second electrode 52 serving as the transmitting electrode Tx2 and as the common electrode COM2, and Rx driver 202 supplies the common voltage Vcom (common drive signal) to the third electrode 53 serving as the receiving electrode Rx. As a result, all of the first electrode 51 serving as the transmitting electrode Tx1 and as the common electrode COM1, the second electrode 52 serving as the transmitting electrode Tx2 and as the common electrode COM2, and the receiving electrode Rx are controlled so as to have the common voltage Vcom.

During the touch sensing period TS, the Tx driver 201 sequentially applies the signal s1 serving as the touch drive signal to the transmitting electrodes Tx (transmitting electrodes Tx1 and Tx2), so that the first electrode 51 and the second electrode 52 function as the touch drive electrode (transmitting electrode Tx) and the third electrode 53 functions as the touch detection electrode (receiving electrode Rx). The Rx driver 202 detects the signal s2 serving as the touch detection signal from the third electrode 53 serving as the receiving electrode Rx.

The common drive signal (common voltage Vcom) defines a pixel voltage applied to the pixel electrode 43 and a display voltage of each pixel for the liquid crystal display function, and defines the signal s1 serving as the touch drive signal to the transmitting electrodes Tx for the touch sensor function. Although FIG. 18 illustrates only a single pulse as the driving waveform in the touch sensing period TS, the alternating-current rectangular wave may be used for driving.

8-3. Driver Configuration Example

Figure 19:
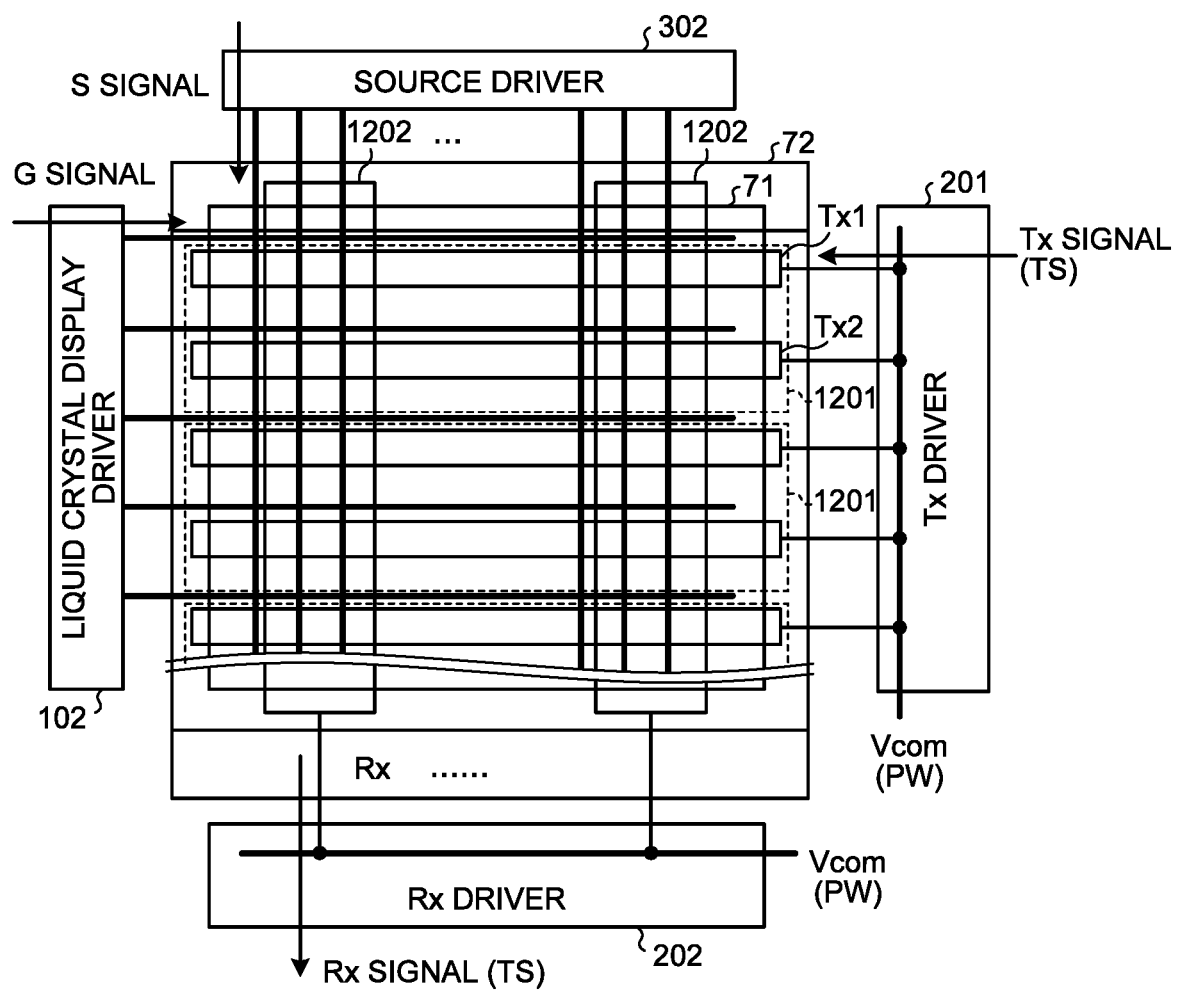
FIG. 19 is a diagram illustrating a configuration example of drivers and electrodes of the liquid crystal touch panel module of the seventh embodiment.

FIG. 19 illustrates a configuration example of drivers and patterns of the electrodes (transmitting electrodes Tx and receiving electrode Rx) in the seventh embodiment. The drivers are the same as those of FIG. 17. Although FIG. 19 illustrates the drivers outside the frame portion 72, the drivers can be implemented in the frame portion 72. The display area 71 of the panel unit 1 of the liquid crystal display device with a touch sensor includes gate lines G, source lines S, transmitting electrodes Tx, and a receiving electrode Rx, which are the electrodes, and the wires described above. In particular, the display area 71 includes a Tx2 pattern (Tx2 blocks) formed like stripes extending in parallel in the X-direction as referenced as 1201, and an Rx pattern (Rx blocks) formed like stripes extending in parallel in the Y-direction as referenced as 1202. These blocks correspond to the E1 blocks and the E2 blocks described above (FIG. 4). In this case, one block of the Tx2 blocks and the Rx blocks includes two pixel lines, for example, in the same manner as in the case described above (in the sixth embodiment and FIG. 14).

In particular, the gate lines G and the source lines S are arranged in the display area 71. The transmitting electrodes Tx and the receiving electrode Rx are extended from the display area 71 into the frame portion 72. From the Tx driver 201 to the transmitting electrodes Tx (transmitting electrodes Tx1 and Tx2), the common voltage Vcom is supplied during the period PW, and the signal s1 serving as the touch drive signal, which is a Tx signal, is applied during the touch sensing period TS. The Rx driver 202 supplies the common voltage Vcom to the receiving electrode Rx during the pixel writing period PW, and detects the signal s2 serving as the touch detection signal, which is an Rx signal, from the receiving electrode Rx during the touch sensing period TS.

8-4. Frame Portion Configuration Example

Figure 20:
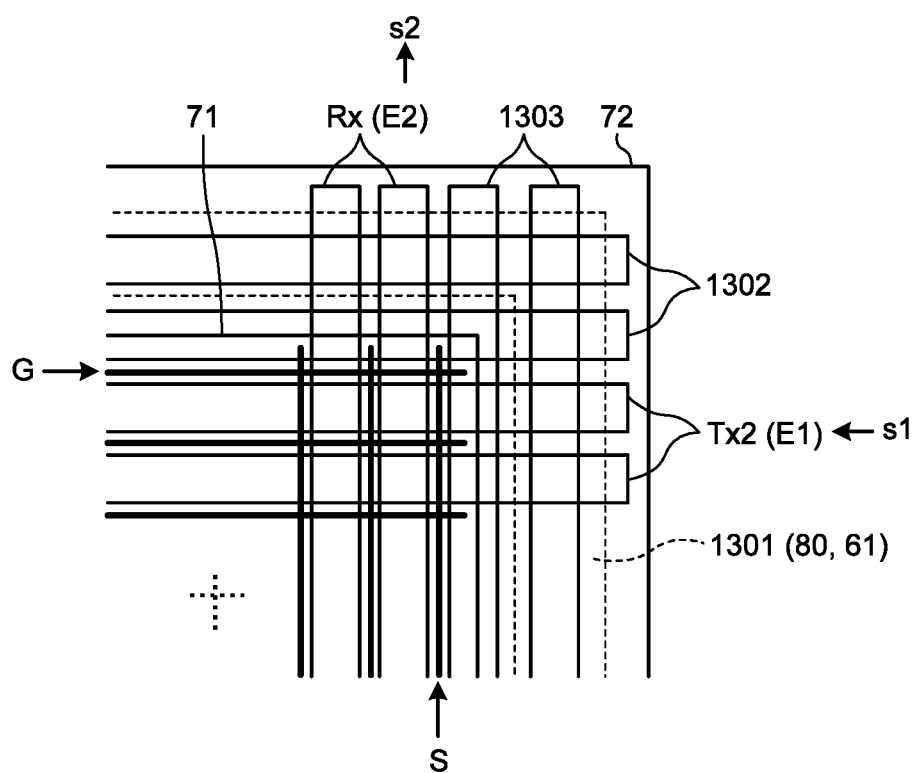
FIG. 20 is a diagram illustrating a detailed configuration example near a frame portion of the liquid crystal touch panel module of the seventh embodiment.

FIG. 20 illustrates a detailed configuration example with respect to extension and overlapping of the electrodes near the frame portion 72 in the seventh embodiment. FIG. 20 illustrates upper right portions of the end portion 73 of the display area 71 and the frame portion 72 of the panel unit 1 of the liquid crystal display device with a touch sensor. The display area 71 is the effective display region. The display area 71 includes, between the gate lines G, lines (or blocks) of the second electrode 52 (transmitting electrode Tx2) to which the signal s1 serving as the touch drive signal is applied, and includes, between the source lines S, lines (or blocks) of the third electrode 53 from which the signal s2 serving as the touch detection signal is detected. FIG. 20 illustrates a case in which one pixel line constitutes one block of the transmitting electrode Tx2 pattern and the receiving electrode Rx pattern (blocks). The frame portion 72 includes the above-described area in which the peripheral circuit 80 and the upper/lower conducting portion 61 are disposed, as referenced as 1301. The transmitting electrode Tx and the receiving electrode Rx are extended in the X- and Y-directions from the display area 71 into the frame portion 72, and overlap the area 1301. For example, the lines of the transmitting electrode Tx2 extending in the X-direction are extended to an end of the frame portion 72. For ease of understanding, FIG. 20 illustrates a slight gap provided at the end of the frame portion 72.

In addition to placing the lines of the transmitting electrode Tx and the receiving electrode Rx in extending directions thereof, the present configuration example arranges the lines repeatedly in directions perpendicular to the extending directions so that the lines overlap the frame portion 72 (area 1301). For example, lines 1302 of the transmitting electrode Tx2 are repeatedly arranged not only in the place where pixels are formed in the display area 71, but also in the frame portion 72 in the Y-direction so as to overlap the area 1301. The same applies to lines 1303 of the receiving electrode Rx. The lines 1302 and 1303 are not limited to be arranged independently (floating), but may be arranged continuously over the end portion 73 of the display area 71 and the frame portion 72 when the width of one line (block) is large. The present configuration example enhances the sensitivity and uniformity of touch detection of the end portion 73 of the display area 71, and shields the peripheral circuit 80 provided in the frame portion 72.

9. ADVANTAGEOUS EFFECTS

As has been described above, regarding the panel unit 1 of the liquid crystal display device with an in-cell capacitive touch sensor (particularly of the combined use type), the embodiments can avoid the adverse effects due to proximity to the peripheral circuit 80 caused by extension of the transmitting electrodes Tx and the receiving electrode Rx, which are electrodes, from the display area 71 to the frame portion 72, and can improve and/or raise the touch detection sensitivity in the touch detection area corresponding to the display area 71 including the end portion 73.

While the invention made by the inventor of the present disclosure has been specifically described above based on the embodiments, it is obvious that the present disclosure is not limited to the above-described embodiments, but can be variously modified within the scope not departing from the gist of the present disclosure.

For example, the panel unit 1 of the liquid crystal display device with a touch sensor of the present disclosure is applicable not only to the liquid crystal display device but also generally to other display devices. The panel unit 1 of the present disclosure is also applicable to other systems such as an electrophoretic display (EPD) system. For example, in the case of applying the liquid crystal display device with a touch sensor of the present disclosure to the EPD, it is only necessary to use a display function layer such as a microcapsule layer instead of the liquid crystal layer 30 illustrated in FIG. 7, for example. The embodiments of the present disclosure can be used for various electronic apparatuses such as mobile devices.

10. APPLICATION EXAMPLES

Next, with reference to FIGS. 24 to 37, a description will be made of application examples of the panel unit 1 of the liquid crystal display device with a touch sensor that has been described in the embodiments of the present disclosure. FIGS. 24 to 37 are diagrams illustrating examples of electronic apparatuses to which the liquid crystal display device according to the embodiments of the present disclosure is applied. The panel unit 1 of the liquid crystal display device with a touch sensor according to the embodiments of the present disclosure can be applied to electronic apparatuses of all fields, such as mobile devices including mobile phones and smartphones, television devices, digital cameras, notebook type personal computers, video cameras, and meters, etc. installed in vehicles. In other words, the panel unit 1 of the liquid crystal display device with a touch sensor according to the embodiments of the present disclosure can be applied to electronic apparatuses of all fields that display externally received or internally generated video signals as images or video pictures. The electronic apparatuses each include a control device that supplies the video signals to the panel unit 1 of the liquid crystal display device with a touch sensor, and controls operations of the panel unit 1 of the liquid crystal display device with a touch sensor. The present embodiments can also be used for various electronic apparatuses such as vehicle on-board equipment. For example, the panel unit 1 of the liquid crystal display device with a touch sensor may be installed on an exterior panel mounted on a vehicle, or may be a part of a meter unit that displays a fuel gauge, a water temperature gauge, a speedometer, a tachometer, etc.

10-1. Application Example 1

Figure 24:
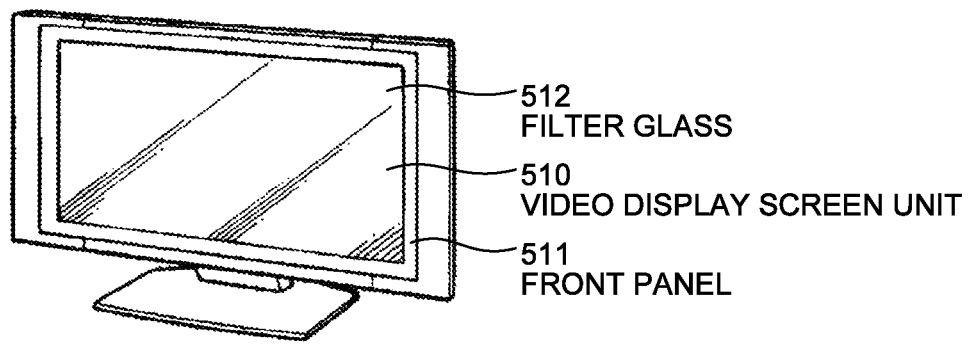
FIG. 24 is a diagram illustrating an example of an electronic apparatus to which the liquid crystal display device according to the embodiments of the present disclosure is applied.

The electronic apparatus illustrated in FIG. 24 is a television device to which the panel unit 1 of the liquid crystal display device with a touch sensor according to the embodiments of the present disclosure is applied. This television device includes, for example, a video display screen unit 510 that includes a front panel 511 and a filter glass 512. The video display screen unit 510 is the panel unit 1 of the liquid crystal display device with a touch sensor according to the embodiments of the present disclosure.

10-2. Application Example 2

Figure 25:
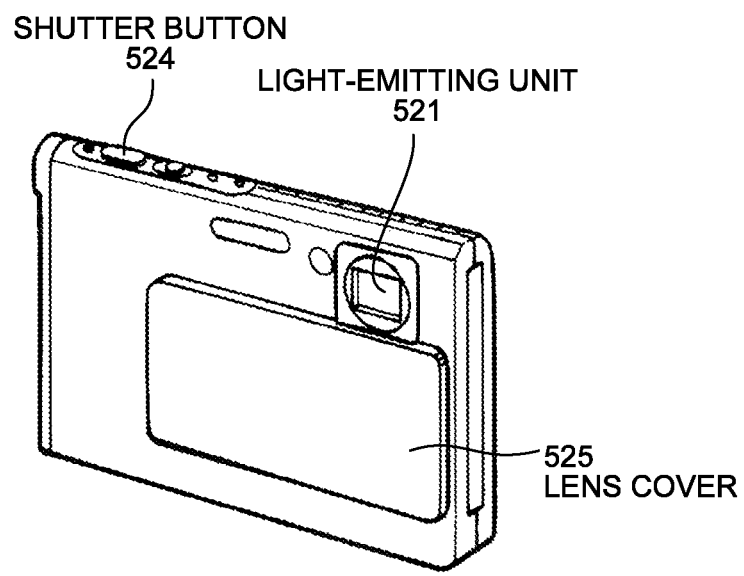
FIG. 25 is a diagram illustrating an example of an electronic apparatus to which the liquid crystal display device according to the embodiments is applied.
Figure 26:
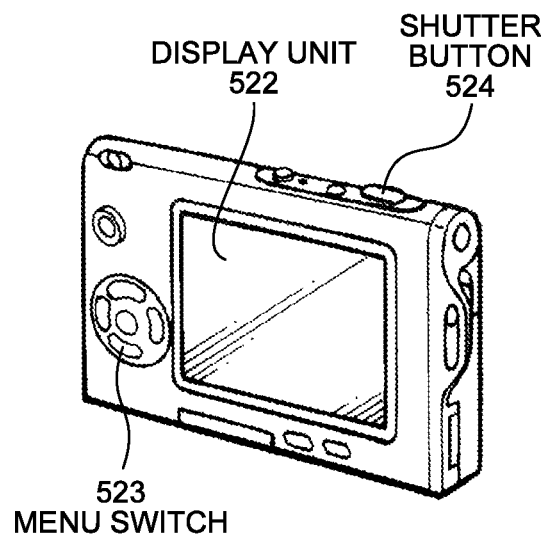
FIG. 26 is a diagram illustrating an example of an electronic apparatus to which the liquid crystal display device according to the embodiments is applied.

The electronic apparatus illustrated in FIGS. 25 and 26 is a digital camera to which the panel unit 1 of the liquid crystal display device with a touch sensor according to the embodiments of the present disclosure is applied. This digital camera includes, for example, a light-emitting unit 521 for flash, a display unit 522, a menu switch 523, and a shutter button 524. The display unit 522 is the panel unit 1 of the liquid crystal display device with a touch sensor according to the embodiments of the present disclosure. As illustrated in FIG. 25, this digital camera includes a lens cover 525. Sliding the lens cover 525 exposes a picture-taking lens. The digital camera can take a digital photograph by imaging light coming through the picture-taking lens.

10-3. Application Example 3

Figure 27:
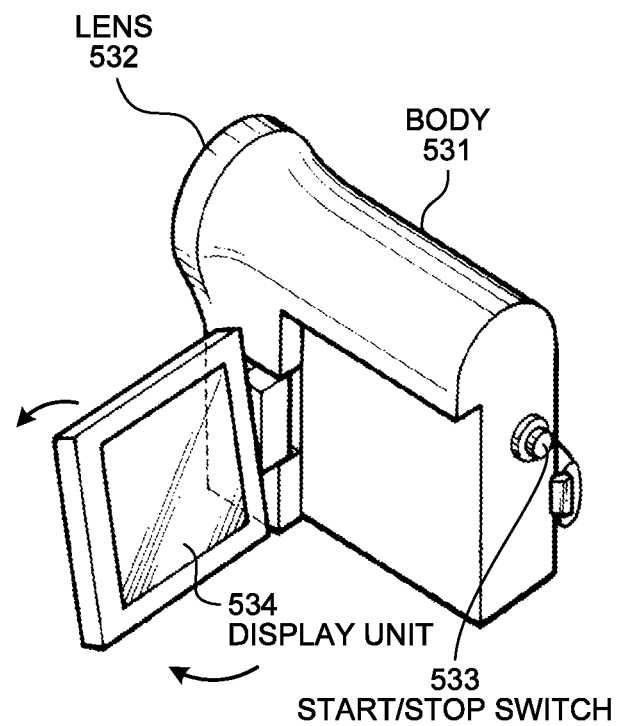
FIG. 27 is a diagram illustrating an example of an electronic apparatus to which the liquid crystal display device according to the embodiments is applied.

The electronic apparatus illustrated in FIG. 27 represents an external appearance of a video camera to which the panel unit 1 of the liquid crystal display device with a touch sensor according to the embodiments of the present disclosure is applied. This video camera includes, for example, a body 531, a lens 532 for taking a subject provided on the front side face of the body 531, and a start/stop switch 533 and a display unit 534 used during shooting. The display unit 534 is the panel unit 1 of the liquid crystal display device with a touch sensor according to the embodiments of the present disclosure.

10-4. Application Example 4

Figure 28:
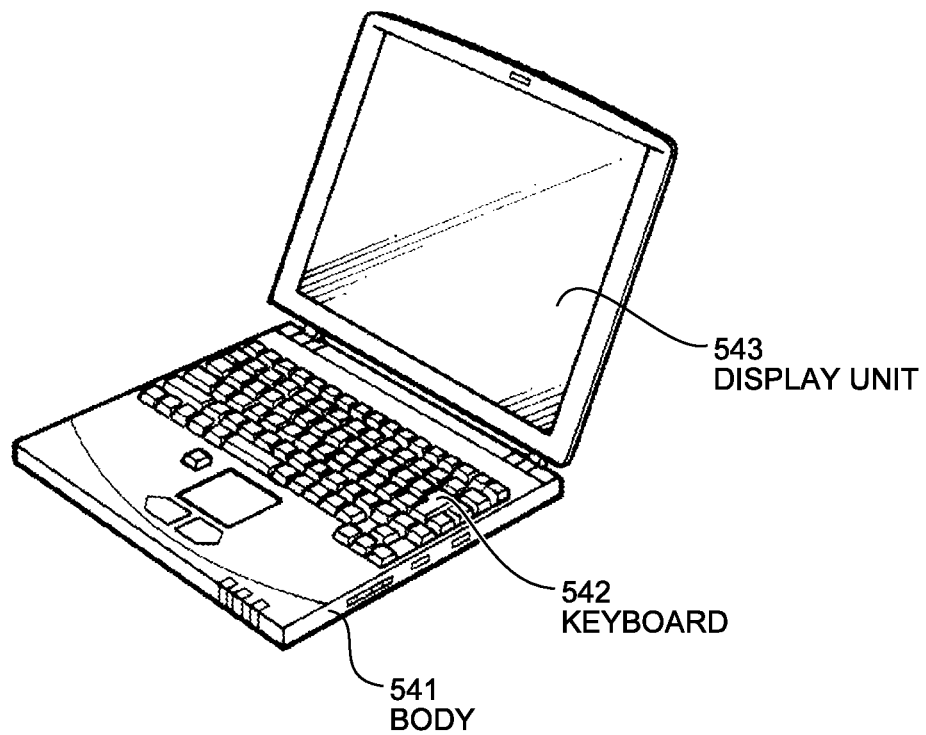
FIG. 28 is a diagram illustrating an example of an electronic apparatus to which the liquid crystal display device according to the embodiments is applied.

The electronic apparatus illustrated in FIG. 28 is a notebook type personal computer to which the panel unit 1 of the liquid crystal display device with a touch sensor according to the embodiments of the present disclosure is applied. This notebook type personal computer includes, for example, a body 541, a keyboard 542 for input operation of characters, etc., and a display unit 543 that displays images. The display unit 543 is constituted by the panel unit 1 of the liquid crystal display device with a touch sensor according to the embodiments of the present disclosure.

10-5. Application Example 5

Figure 29:
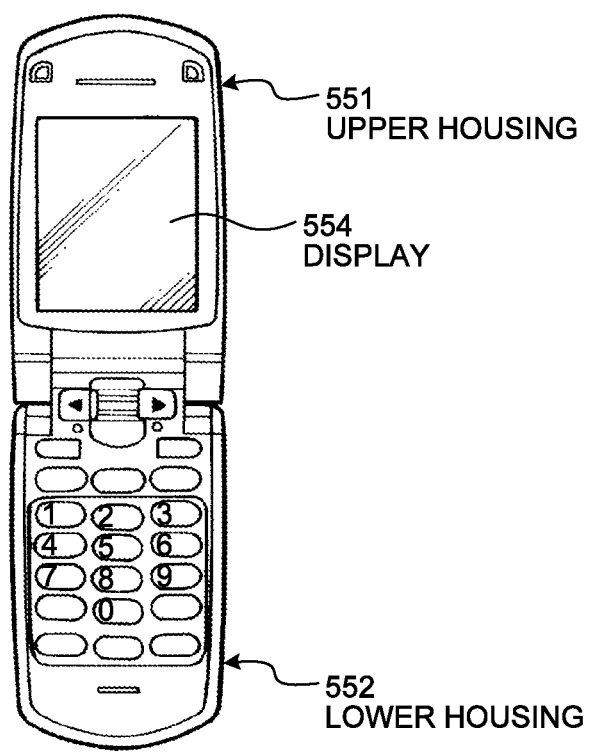
FIG. 29 is a diagram illustrating an example of an electronic apparatus to which the liquid crystal display device according to the embodiments is applied.
Figure 30:
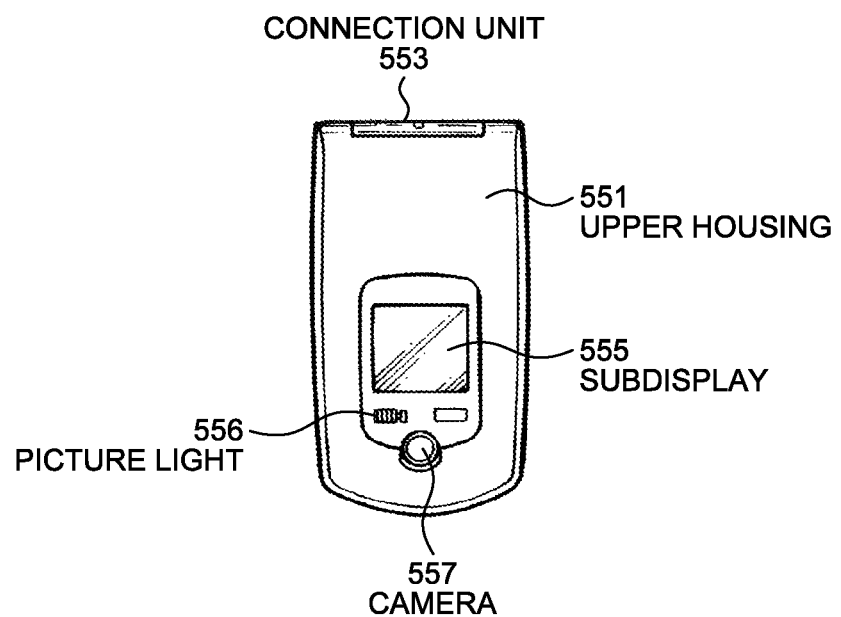
FIG. 30 is a diagram illustrating an example of an electronic apparatus to which the liquid crystal display device according to the embodiments is applied.

The electronic apparatus illustrated in FIGS. 29 and 30 is a mobile phone to which the panel unit 1 of the liquid crystal display device with a touch sensor is applied. FIG. 29 is a front view of the mobile phone when it is unfolded. FIG. 30 is a front view of the mobile phone when it is folded. This mobile phone is, for example, composed of an upper housing 551 and a lower housing 552 connected to each other by a connection unit (hinge unit) 553, and includes a display 554, a subdisplay 555, a picture light 556, and a camera 557. The panel unit 1 of the liquid crystal display device with a touch sensor is mounted to the display 554. This allows the display 554 of the mobile phone to have the function to detect touch operation in addition to the function to display images.

10-6. Application Example 6

Figure 31:
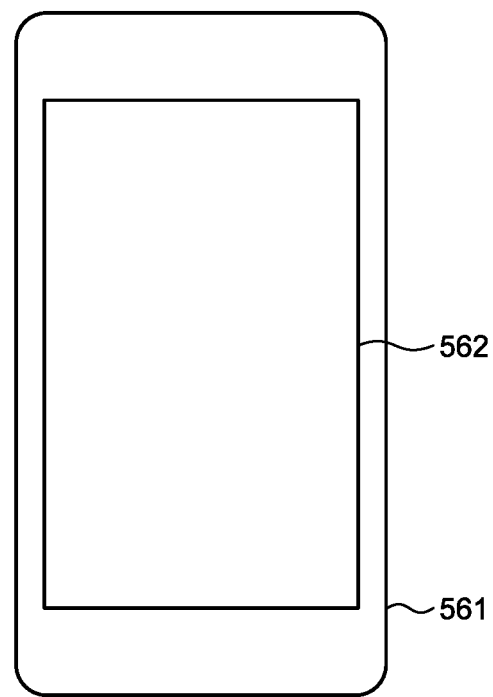
FIG. 31 is a diagram illustrating an example of an electronic apparatus to which the liquid crystal display device according to the embodiments is applied.

The electronic apparatus illustrated in FIG. 31 is a personal digital assistant that operates as a portable computer, a multifunctional mobile phone, a portable computer with voice call capability, or a portable computer with communication capability, and that is sometimes called a smartphone or a tablet computer. This personal digital assistant includes a display unit 562 on a surface of a housing 561. The display unit 562 is the panel unit 1 of the liquid crystal display device with a touch sensor according to the embodiments of the present disclosure.

Regarding an in-cell capacitive liquid crystal touch panel (particularly of a combined use type), aspects of the present disclosure can avoid adverse effects due to proximity to a peripheral circuit caused by extension of electrode units from a display area into a frame portion, and can improve and/or raise touch detection sensitivity of a touch detection area corresponding to the display area including an end portion thereof.

The present disclosure includes aspects as follows:

(1) A display device with a touch sensor having a display function and a touch sensor function, the display device comprising:

a panel unit that comprises a first substrate, a second substrate, and a display function layer between the first substrate and the second substrate;

a first electrode on the first substrate having a function as a first touch drive electrode that constitutes the touch sensor function;

a second electrode on the second substrate having a function as a second touch drive electrode that constitutes the touch sensor function;

a third electrode on the second substrate having a function as a touch detection electrode that constitutes the touch sensor function; and a capacitor for the touch sensor function, the capacitor being formed between either of the first electrode and the second electrode and the third electrode, or between both the first electrode and the second electrode and the third electrode; wherein when the touch sensor function is used, a first signal is applied to the first electrode and the second electrode, and a second signal is detected from the third electrode through the capacitor;

the first electrode of the first substrate is disposed in a display area of the panel unit, and the second electrode of the second substrate is disposed in a frame portion outside the display area, and the first electrode and the second electrode are connected to each other by an upper/lower conducting portion provided at the frame portion; and the frame portion comprises, on the first substrate thereof, a peripheral circuit, and the second electrode is provided in a position more distant upward from the peripheral circuit than the first electrode.

(2) The display device with a touch sensor according to (1), wherein the frame portion includes an extended portion of the first electrode provided on the first substrate and includes the second electrode provided on the second substrate; and the second electrode is extended wider outward than the extended portion of the first electrode in plan view.

(3) The display device with a touch sensor according to (1), wherein the second electrode provided on the second substrate comprises an extended portion extended from the frame portion into the display area, so that the first electrode in the display area and the extended portion of the second electrode are parallel to each other.

(4) The display device with a touch sensor according to (1), wherein the display function layer is a layer in which display is performed by application of a voltage between the first substrate and the second substrate;

the first substrate comprises a pixel electrode in a position between the first substrate and the second substrate for each pixel;

the first electrode is configured to form a retention capacitor for each of the pixels;

the second electrode is disposed over the display area on the second substrate;

the first electrode has both a function as a first common electrode unit that constitutes the display function and the function as the first touch drive electrode that constitutes the touch sensor function;

the second electrode has both a function as a second common electrode unit that constitutes the display function and the function as the second touch drive electrode that constitutes the touch sensor function; and during a touch sensing period when the touch sensor function is used, the first signal is applied to the first electrode and the second electrode, and the second signal is detected from the third electrode through the capacitor.

(5) The display device with a touch sensor according to (1), wherein the display function layer is a layer in which display is performed by application of a voltage in a direction substantially parallel to an in-plane direction of the first substrate or the second substrate;

the first substrate comprises a pixel electrode for each pixel;

the first electrode has both a function as a first common electrode unit that constitutes the display function and the function as the first touch drive electrode that is constitutes the touch sensor function;

the second electrode has the function as the second touch drive electrode that constitutes the touch sensor function; and during a touch sensing period when the touch sensor function is used, the first signal is applied to the first electrode and the second electrode, and the second signal is detected from the third electrode through the capacitor.

(6) The display device with a touch sensor according to (1), wherein the second substrate has a first surface and a second surface, wherein the first surface is closer to the display function layer than the second surface, the second electrode is formed on the first surface of the second substrate; and the third electrode is formed on the second surface of the second substrate.

(7) The display device with a touch sensor according to (1), wherein the upper/lower conducting portion includes conductive particles dispersed in sealing material; and the second electrode comprises, in the frame portion, a portion overlapping the area of the peripheral circuit, the second electrode, and the upper/lower conducting portion in plan view.

(8) The display device with a touch sensor according to (1), wherein each of the first electrode and the second electrode is formed in a pattern of transparent electrodes extending in parallel in a first direction;

the third electrode is formed in a pattern of transparent electrodes in parallel in a second direction;

touch detection units are formed in intersection regions of the patterns of the second electrode and the third electrode; and the first signal is sequentially applied to each of a plurality of lines of the patterns of the first electrode and the second electrode, so that the second signal is detected from each of a plurality of lines of the pattern of the third electrode through the capacitor corresponding to the touch detection units.

(9) The display device with a touch sensor according to (1), wherein the first substrate comprises gate lines in parallel in a first direction that are elements constituting pixels;

the second electrode is disposed over the display area;

the second electrode is formed in a pattern of transparent electrodes in parallel in the first direction;

the third electrode is formed in a pattern of transparent electrodes in parallel in a second direction; and the pattern of the second electrode comprises first slits in parallel in the first direction in positions overlapping, in plan view, the gate lines for a plurality of pixel lines so as to be divided into a plurality of blocks.

(10) The display device with a touch sensor according to (9), wherein the pattern of the second electrode comprises second slits in parallel in the first direction in positions overlapping, in plan view, the gate lines except in the positions of the first slits, and the second slits are composed of open portions and non-open portions.

(11) The display device with a touch sensor according to (9), wherein the panel unit is driven when the display function by column inversion driving or frame inversion driving.

(12) The display device with a touch sensor according to (1), wherein the first substrate comprises:

gate lines in parallel in a first direction and source lines in parallel in a second direction that constitute pixels; and a driver that is connected to or built into the panel unit;

the driver comprises:

a gate driver connected to the gate lines;

a source driver connected to the source lines;

a touch drive driver connected to the first electrode and the second electrode; and a touch detection driver connected to the third electrode;

the touch drive driver is configured to apply, to the first electrode and the second electrode, a signal for pixel writing during a pixel writing period of one horizontal period, and the first signal during a touch sensing period of one horizontal period; and the touch detection driver is configured to apply, to the third electrode, the signal for pixel writing during the pixel writing period of one horizontal period, and to detect, from the third electrode, the second signal during the touch sensing period of one horizontal period.

(13) The display device with a touch sensor according to (12), further comprising:

a first controller that is connected to the touch drive driver and the touch detection driver and performs drive control of the touch sensor function; and a second controller that is connected to the gate driver and the source driver and performs drive control of the display function.

(14) An electronic apparatus comprising:

the display device with a touch sensor according to (1).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electronic device comprising:
a substrate;
pixels on the substrate;
a first electrode overlapping the pixels in a plan view;
a second electrode overlapping an edge of the first electrode in a plan view, the second electrode being electrically coupled to the first electrode;
a counter substrate facing the substrate; and
a sealing material between the substrate and the counter substrate,
wherein
the first electrode has:
 a first region that overlaps the second electrode in a plan view; and
 a second region that does not overlap the second electrode in a plan view,
the second electrode overlaps the sealing material in a plan view, and
the second electrode continuously extends to overlap both of:
 the first region of the first electrode; and
 the sealing material, in a non-display area around a display area, in a plan view.

2. The electronic device according to claim 1, wherein the first region is located between the edge and the second region of the first electrode.

3. The electronic device according to claim 1,
wherein the first region overlaps the second electrode in the non-display area in a plan view.

4. The electronic device according to claim 1,
wherein the first region overlaps the second electrode in both the display area and the non-display area in a plan view.

5. The electronic device according to claim 1, wherein
the substrate has sides including a first side,
the first side faces the edge of the first electrode, and is closest to the edge among the sides, and
the second electrode has a region located between the first side and the edge of the first electrode.

6. The electronic device according to claim 1, wherein the second electrode does not overlap the pixels.

7. An electronic device comprising:
pixel electrodes each located in respective pixels;
a first electrode overlapping the pixel electrodes in a plan view;

a second electrode overlapping an edge of the first electrode in a plan view, the second electrode being electrically coupled to the first electrode;

a first substrate;

a second substrate facing the first substrate; and a sealing material between the first substrate and the second substrate, wherein the first electrode has:

a first region that overlaps the second electrode in a plan view; and a second region that does not overlap the second electrode in a plan view, the second electrode overlaps the sealing material in a plan view, and the second electrode continuously extends to overlap, in a plan view, both of:

in a display area, the pixel electrodes and a part of the first region of the first electrode; and in a non-display area around the display area, the sealing material and the rest of the first region of the first electrode.

8. The electronic device according to claim 7, wherein the first region is located between the edge and the second region of the first electrode.

9. The electronic device according to claim 7, wherein the first region overlaps the second electrode in the non-display area in a plan view.

10. The electronic device according to claim 7, wherein the first region overlaps the second electrode in both the display area and the non-display area in a plan view.

11. The electronic device according to claim 7, wherein the edge of the first electrode is located in the non-display area, the second electrode has a first region, and the edge of the first electrode is located between the display area and the first region in a plan view.

* * * * *